United States Patent
Haber et al.

(10) Patent No.: US 10,727,938 B2
(45) Date of Patent: Jul. 28, 2020

(54) OVERCOMING RAYLEIGH BACKSCATTER IN WAVELENGTH DIVISION MULTIPLEXED FIBER OPTIC SENSOR SYSTEMS AND FAULT DETECTION IN OPTICAL NETWORKS

(71) Applicant: LUNA INNOVATIONS INCORPORATED, Roanoke, VA (US)

(72) Inventors: Todd Christian Haber, Jonhs Creek, GA (US); Justin Stay, Atlanta, GA (US); Joel Leslie Mock, Peachtree Corners, GA (US); Daniele Costantini, St. Prex (CH)

(73) Assignee: Luna Innovations Incorporated, Roanoke, VA (US)

( * ) Notice: Subject to any disclaimer, the term of this patent is extended or adjusted under 35 U.S.C. 154(b) by 0 days.

(21) Appl. No.: 16/298,797

(22) Filed: Mar. 11, 2019

(65) Prior Publication Data
US 2019/0280767 A1    Sep. 12, 2019

Related U.S. Application Data

(60) Provisional application No. 62/773,406, filed on Nov. 30, 2018, provisional application No. 62/641,141, filed on Mar. 9, 2018.

(51) Int. Cl.
*H04B 10/071* (2013.01)
*G01M 11/00* (2006.01)

(52) U.S. Cl.
CPC ....... *H04B 10/071* (2013.01); *G01M 11/3127* (2013.01)

(58) Field of Classification Search
CPC .................. H04B 10/071; G01M 11/31–3172
See application file for complete search history.

(56) References Cited

U.S. PATENT DOCUMENTS

| | | | |
|---|---|---|---|
| 2007/0183465 A1* | 8/2007 | Mullane | H01S 5/0625 372/20 |
| 2013/0148190 A1* | 6/2013 | Taverner | G01J 3/1895 359/341.1 |

\* cited by examiner

*Primary Examiner* — Casey L Kretzer
(74) *Attorney, Agent, or Firm* — Nixon & Vanderhye P.C.

(57) ABSTRACT

Systems, methods, and structures for overcoming Rayleigh backscatter in wavelength division multiplexed fiber optic systems and in particular fiber optic sensor systems along with method(s) for detecting faults in optical networks employing the intentional temporal separation of share wavelength noise and demarcation signals in conjunction with the use of accumulated Rayleigh noise signal(s) to detect a fault location.

7 Claims, 33 Drawing Sheets

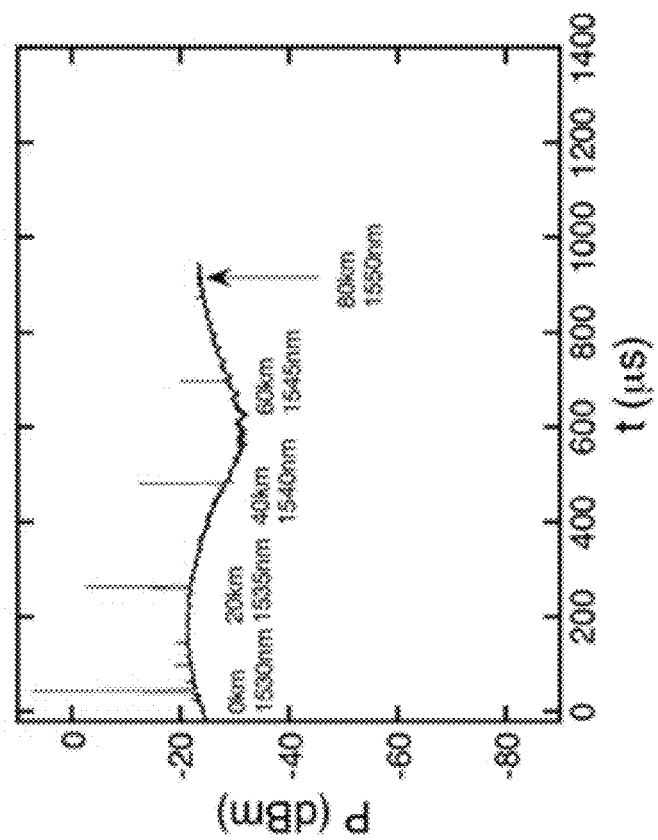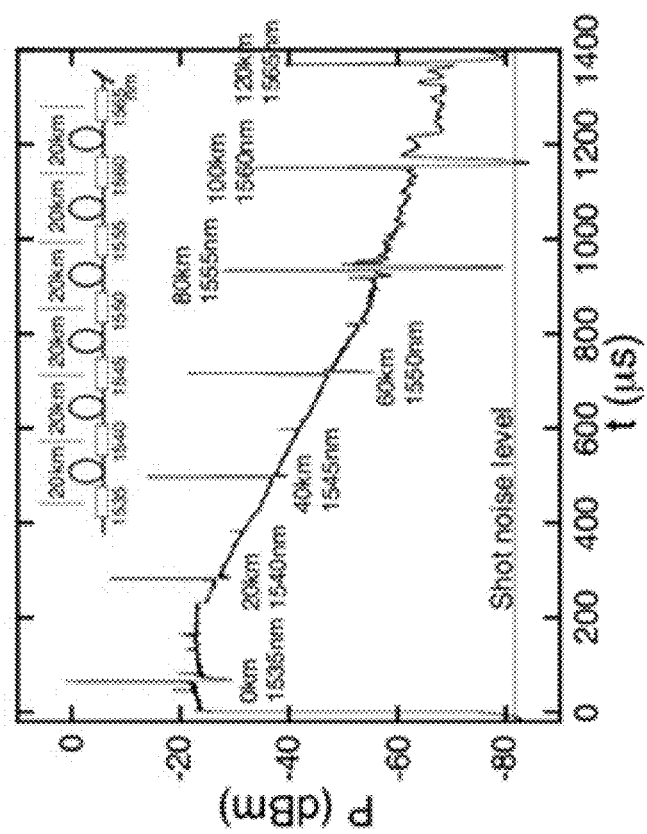
*Prior Art*
*FIG 22*

US 10,727,938 B2

OVERCOMING RAYLEIGH BACKSCATTER IN WAVELENGTH DIVISION MULTIPLEXED FIBER OPTIC SENSOR SYSTEMS AND FAULT DETECTION IN OPTICAL NETWORKS

CROSS REFERENCE TO RELATED APPLICATIONS

This application claims the benefit of U.S. Provisional Patent Application Ser. No. 62/641,141 filed Mar. 9, 2018, and U.S. Provisional Patent Application Ser. No. 62/773,406 filed Nov. 30, 2018, the entire contents of both are incorporated by reference as if set forth at length herein.

TECHNICAL FIELD

This disclosure relates generally to optical networks. More particularly, it pertains to methods for overcoming or otherwise reducing Rayleigh backscatter in wavelength division multiplexed fiber optic sensor networks.

BACKGROUND

As is known, optical networks—and in particular passive optical networks (PONs)—are an increasingly important component of global communications networks and internetworks thereof ("Internet"). Given their importance to contemporary society, methods of improving their performance is of great interest. Of particular interest, are methods that mitigate and/or eliminate signal losses and improve optical signal to noise ratio (OSNR). Accordingly, such improved methods for improved OSNR would represent a welcome addition to the art.

SUMMARY

An advance is made in the art according to aspects of the present disclosure directed to methods for overcoming Rayleigh backscatter in wavelength division multiplexed fiber optic systems and in particular fiber optic sensor systems.

Viewed from a first aspect—and according to aspects of the present disclosure—Rayleigh limitations are mitigated by modulating the intensity of a swept wavelength laser. In sharp contrast to the prior art, a scan range of the laser is limited to a very small subset of the range of sensors/GPON marker wavelength illuminating small (~1 nm) spectral slices per scan of the swept wavelength laser, serially stitching these slices of fiber bragg grating (FBG) peak identified spectrum at distance across subsequent wavelength range stepped sweeps of the laser—thereby allowing for SNR optimized reconstruction of a complete spectrum exhibiting reduced noise floor degradation due to Rayleigh backscatter. Advantageously, methods according to the present disclosure uniquely meet measurement requirements of GPON demarcation architecture. Additionally, each slice provides OTDR-like Rayleigh-decay traces that offer increased insight into the nature of transmission faults that may exist between an Optical Line Termination (OLT) and an Optical Networking Unit (ONU).

Viewed from another aspect—an advance is made in the art according to aspects of the present disclosure directed to a method for detecting faults in optical networks employing the intentional temporal separation of share wavelength noise and demarcation signals in conjunction with the use of accumulated Rayleigh noise signal to detect a fault location.

This SUMMARY is provided to briefly identify some aspect(s) of the present disclosure that are further described below in the DESCRIPTION. This SUMMARY is not intended to identify key or essential features of the present disclosure nor is it intended to limit the scope of any claims.

The term "aspect" is to be read as "at least one aspect". The aspects described above and other aspects of the present disclosure are illustrated by way of example(s) and not limited in the accompanying drawing.

BRIEF DESCRIPTION OF THE DRAWING

A more complete understanding of the present disclosure may be realized by reference to the accompanying drawing in which:

FIG. 14(A), FIG. 14(B), and FIG. 14(C), are a series of plots of Power vs. Time in which: FIG. 14(A) is a full-band swept source trace with elevated Rayleigh noise floor; FIG. 14(B) is a sub-band swept source scans centered about 10 FBG wavelengths with lowered Rayleigh noise floor; and FIG. 14(C) is peak hold of sub-band scans aggregated into a full band response all according to aspects of the present disclosure;

FIG. 22 is a pair of plots illustrating gating time window for laser sweep results in a constant SNR of the measurement (left) as compared to concurrent source sweep and sensor detection timing (right) according to aspects of the present disclosure.

DETAILED DESCRIPTION

Figure 1:
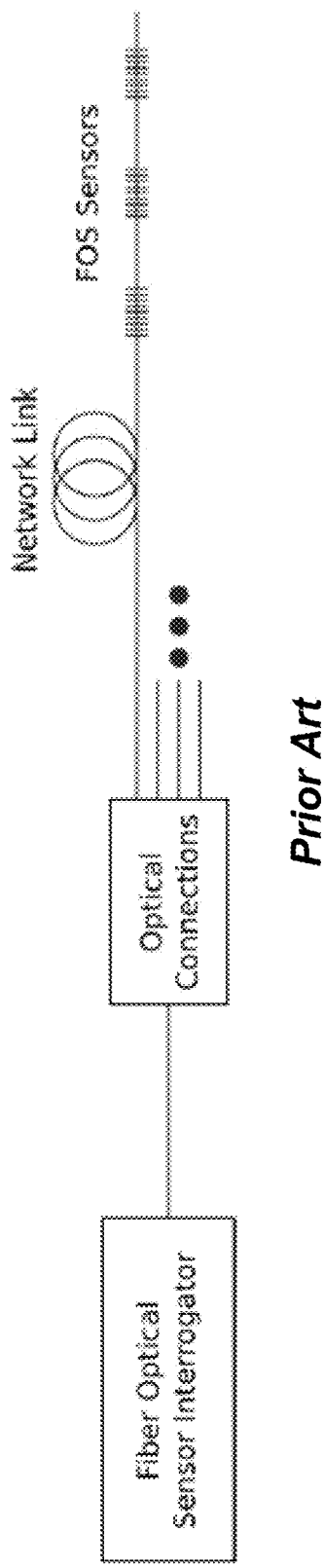
FIG. 1 is a schematic diagram of an illustrative fiber optic sensor (FOS) network according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

By way of some additional background, we begin by noting that modern optical networks are being deployed globally at an ever-increasing pace. As will be readily appreciated, the quality of optical signals propagating through such optical networks is adversely affected by a number of phenomena. More particularly, loss mechanisms such as material absorption, macro and micro-bending, discrete losses from physical connections, and linear and/or nonlinear scattering phenomenon reduce absolute optical signal levels.

The same scattering phenomenon limits the reach of an optical network as they increase an optical noise floor or optical signal-to-noise-ratio (OSNR) in conjunction with the above-mentioned loss mechanisms. Accordingly, methods to increase OSNR in optical networks is of keen interest and highly valued in the art as an increased OSNR results in longer reaches of optical networks, more sensing locations, and lower overall system costs.

FIG. 1 is a schematic diagram of an illustrative, generic, fiber optic sensor (FOS) network having known loss mechanisms. As may be observed, the generic network shown includes a sensor interrogator optically connected via optical connectors to one or more optical networks including optical network spans followed by a number of fiber optic sensors. While only one span with three sensors are illustratively shown in the figure, those skilled in the art will appreciate that different number(s) of spans of different length(s) and different number(s) of sensors may be employed in a particular configuration. As will be readily appreciated by those skilled in the art, such networks and systems may be used to measure temperature, strain, pressure, displacement, acceleration—and other data—in a plethora of commercially important applications including—but not limited to—civil structure monitoring, perimeter security, and intrusion detection.

Such FOS systems provide great value when used to monitor a large number of sensors distributed over long distances (i.e. pipeline monitoring) and/or used for perimeter security and intrusion detection when assets are likewise spread across large area(s) and distance(s).

Figure 2:
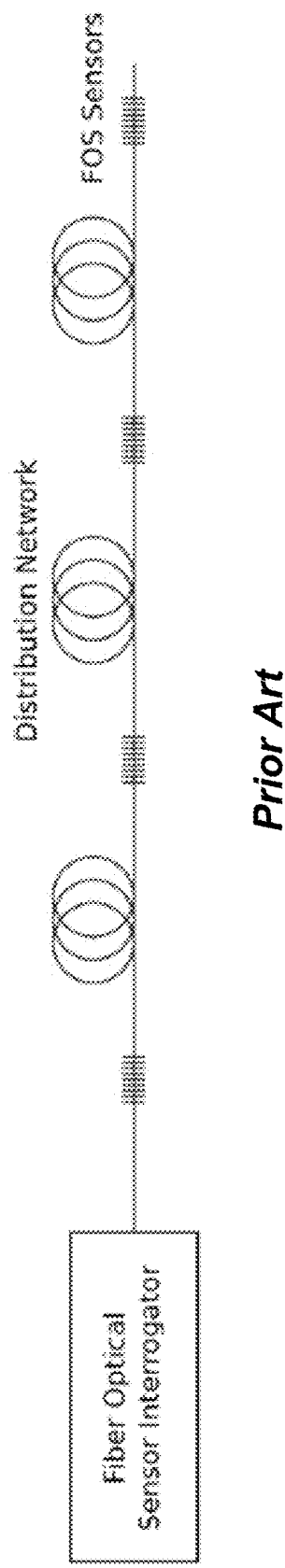
FIG. 2 is schematic diagram of an illustrative FOS network distributed over a large distance according to aspects of the present disclosure.

FIG. 2 is a schematic diagram showing an illustrative FOS network distributed over a large distance. As may be observed from the figure, such FOS applications may require a distribution network including a plurality of optical fiber spans that may extend many 10's of kilometers over the entire FOS network. Oftentimes, such long span systems are limited by either available sensing capacity of an interrogator and/or the decrease in OSNR of the optical signals over the long distances involved.

Figure 3:
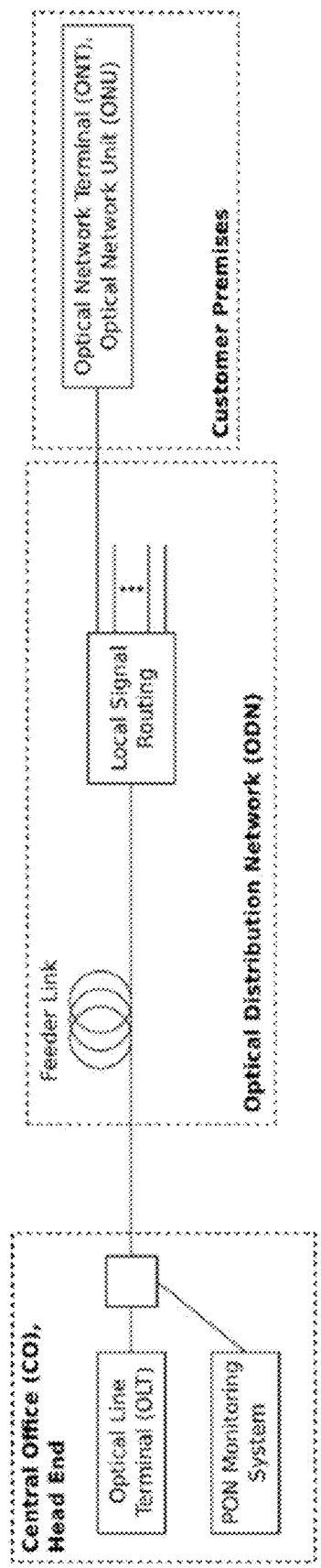
FIG. 3 is a schematic diagram of an illustrative passive optic network (PON) according to aspects of the present disclosure.

FIG. 3 is a schematic diagram showing an illustrative passive optical network (PON) configuration including a central office (head end) in optical communication with a customer premises via an optical distribution network. Operationally, such an illustrative configuration includes an optical line terminal (OLT) feeding a long feeder link, followed by an N port splitter feeding N optical network units (ONU) residing at user premises.

As will be appreciated, systems such as those illustratively shown in the figure are used to monitor link health status on PON and GPON networks by measuring discrete link losses and demarcation of ONUs and ONTs. Known methods for interrogating sensors in a system such as that shown in FIG. 1 include combinations of broadband light or swept laser sources, on-board reference components, and some number of receiver channels in order to characterize the reflected or transmitted spectrum(s) of the optical sensors. The maximum sensor capacity(ies) and maximum link length(s) are often limited by the loss and decrease OSNR phenomena.

As will be further understood and appreciated by those skilled in the art, standard optical fiber attenuates signals at ~0.25 dB/km. Some of the power lost is scattered in all directions (Rayleigh Scattering) and—in long links—can be a significant contributing factor to the noise floor.

Fiber Optic Sensor (FOS) Network

As will be readily appreciated by those skilled in the art, there exist several, well-established FOS technologies. Of particular interest, wavelength division multiplexed (WDM) FOS systems can be described in two main categories namely, 1) swept source, and, 2) broadband source coupled with wavelength separating devices.

Figure 4:
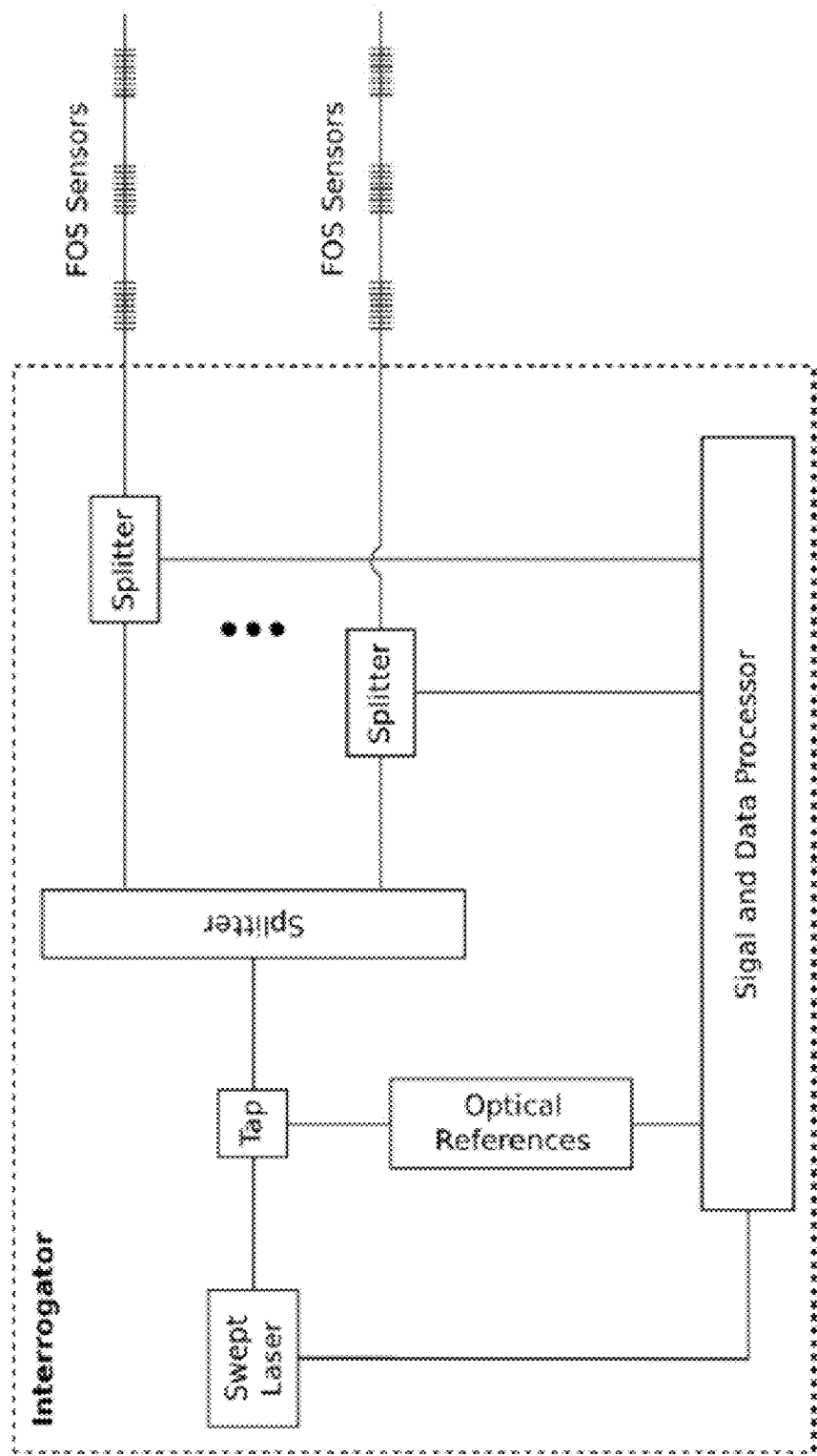
FIG. 4 is a schematic diagram of an illustrative swept laser source FOS interrogator system according to aspects of the present disclosure.

Turning now to FIG. 4, there is shown a schematic diagram of an illustrative swept source laser FOS interrogator system. As shown in the figure, such an interrogator system generally includes the swept source laser, a signal/data processor, and a number of additional optical elements including splitters for optically connecting the swept source laser light to one or more FOS sensors.

Operationally, a tightly controlled, high power, widely tunable laser is used to measure reflected or transmitted signals of a variety of fiber optic based sensors distributed along one or more fiber optic transmission lines. On-board optical references coupled with a large number of data acquisition channels makes this type of system accurate, precise, and robust for a variety of applications.

As is known, swept sources, such as swept laser sources, generate high power, continuous wavelength swept laser source light that can be used to measure the reflected spectra of fiber optic sensors such as fiber Bragg gratings (FBGs) and Fabry-Perot (FP) based sensors. Such swept source laser systems benefit from high signal power(s) and wide swept bandwidth(s) employed. As will be appreciated, high power helps in overcoming large system losses while wide swept bandwidths permit the interrogation of a large numbers of sensors.

Notwithstanding their superior overall system performance, network reaches (lengths) of such swept source systems are often limited by Rayleigh backscattering due to the high-power laser used with the optical fiber network.

Figure 5:
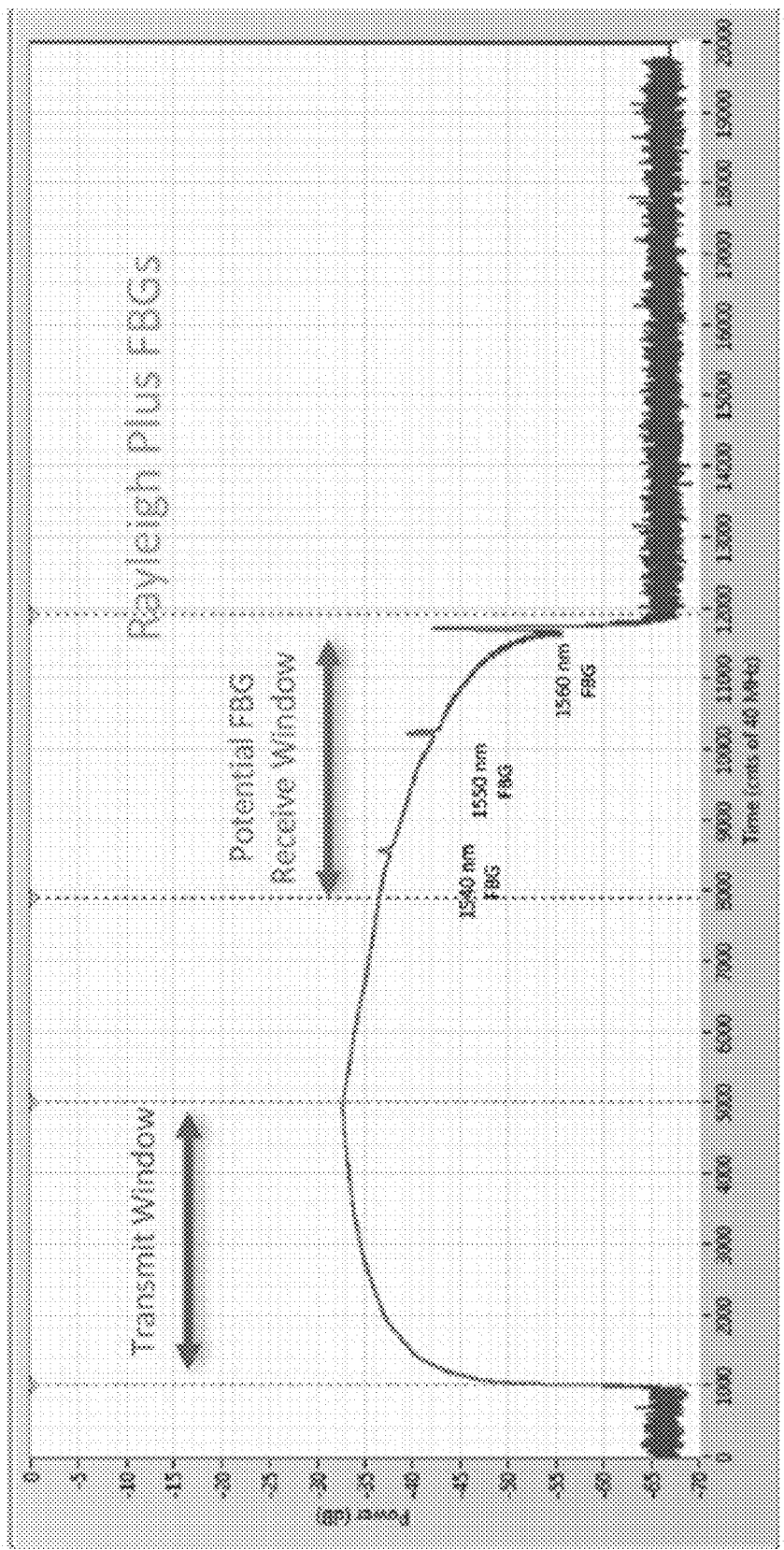
FIG. 5 is a plot of Power vs. Time showing accumulated Rayleigh backscatter signal present in fiber bragg grating (FBG) array of swept laser interrogation system on low reflectivity gratings at 17 km according to aspects of the present disclosure.

FIG. 5 is a graph of Power vs. Time illustrating a limiting case in which a 30 nm swept source interrogation system is measuring reflected signals of three low reflectivity FBG's at a distance of 17 km. Note that the Rayleigh noise floor limits the detection and discrimination of many of the FBG's.

Figure 6:
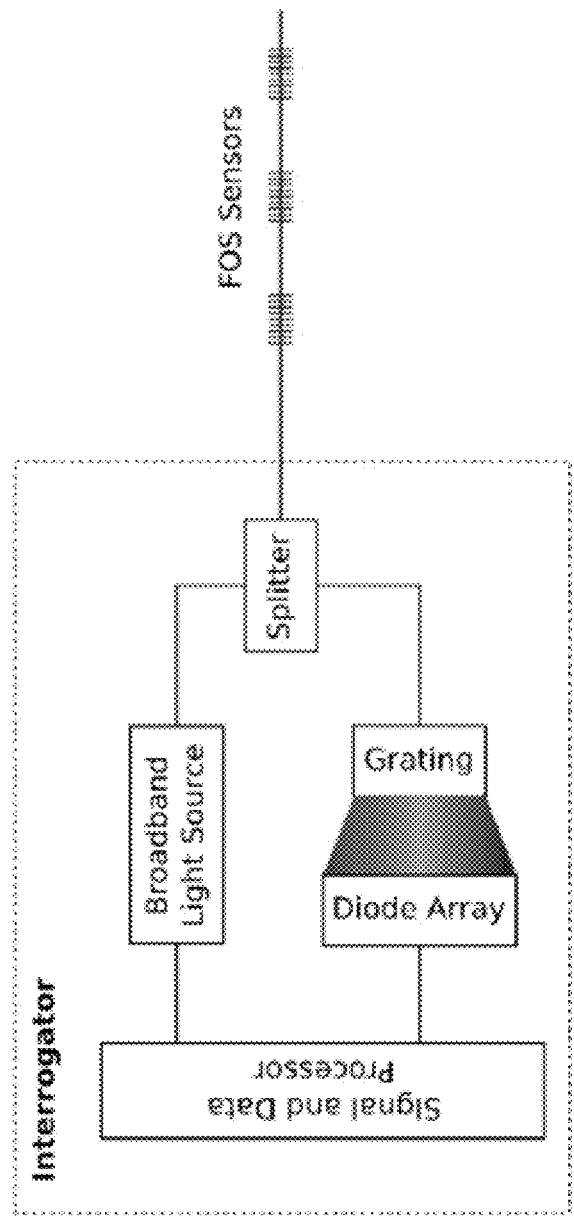
FIG. 6 is a schematic of an illustrative broadband source based FOS interrogator system including a volume grating according to aspects of the present disclosure.

FIG. 6 is a schematic diagram showing an illustrative broad-light-source-based system interrogator and FOS sensors. Illustratively shown in this figure is an interrogator structure including a broadband light source, signal and data processing system, optical splitter(s) connecting the broadband light source to the FOS sensors, and grating/diode array structures. As will be appreciated by those skilled in the art, such broadband-light-source-based systems oftentimes do not exhibit high signal powers and therefore Rayleigh backscatter is less than that for a higher power signal. Unfortunately, reflected sensor signals exhibit lower power as well. Accordingly, such broadband-light-source-based systems are not suitable for applications having even moderate system losses and oftentimes cannot support large sensor counts that swept source laser systems sources support and provide. Furthermore, most of these broadband-light-source-systems are limited by receiver noise as well.

At this point we note that all of the fiber optic sensor systems described so far are fundamentally limited by the OSNR. Notably, the Rayleigh backscatter increases with increasing link lengths and this directly restricts the capacity of systems where capacity indirectly correlates to system cost(s).

Figure 7:
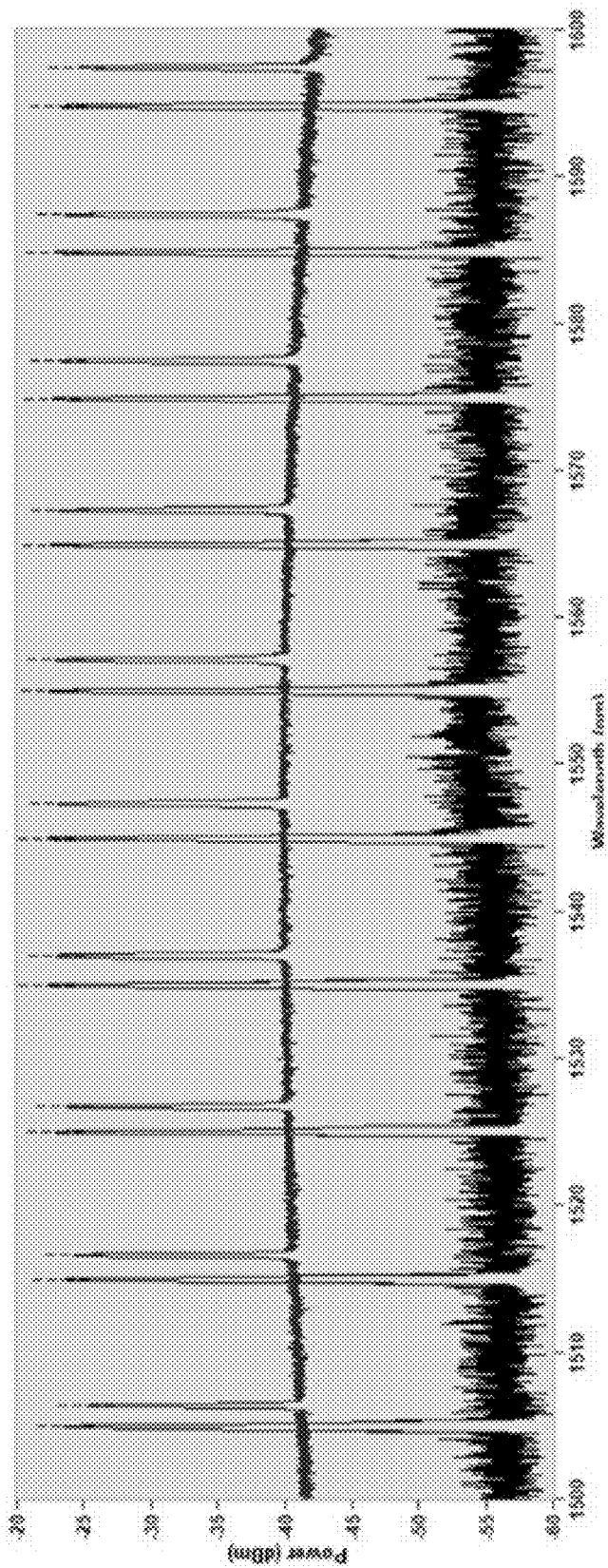
FIG. 7 is a plot of Power vs. Wavelength showing high OSNR signal from an FBG sensor array (bottom plot) and a low OSNR signal from an FBG sensor array (30 km link) (upper plot) limited by Rayleigh according to aspects of the present disclosure.

With reference now to FIG. 7, there is shown a plot of Power vs. Wavelength for two different sensor arrays and received optical signals. The first plot (lower) depicts a system wherein link lengths are minimal and the system is limited by electronic noise on the receiver. Unfortunately, many applications require long links to minimize cost through increased capacity and reach. The second plot (upper) illustrates this latter type of system comprising ~30 km's of fiber where Rayleigh has decreased the OSNR. With this system, a nearly 20 dB reduction in OSNR is observed which affects loss budgets and ultimately affects complexity and cost.

PON Monitoring Systems

As we shall now describe, PON monitoring systems can be categorized in one of two ways, namely, time division multiplexed (TDM), or wavelength division multiplexed (WDM).

TDM PON Monitoring Systems

Optical time domain reflectometer (OTDR) systems comprise the foundation of many PON monitoring systems. As such, OTDR systems and methodologies find widespread use in diagnosing and monitoring network links. Such widespread use is well justified as OTDR is a proven technology used—for example—to locate and detect fiber breakage and abnormally large losses due to network connections.

Figure 8:
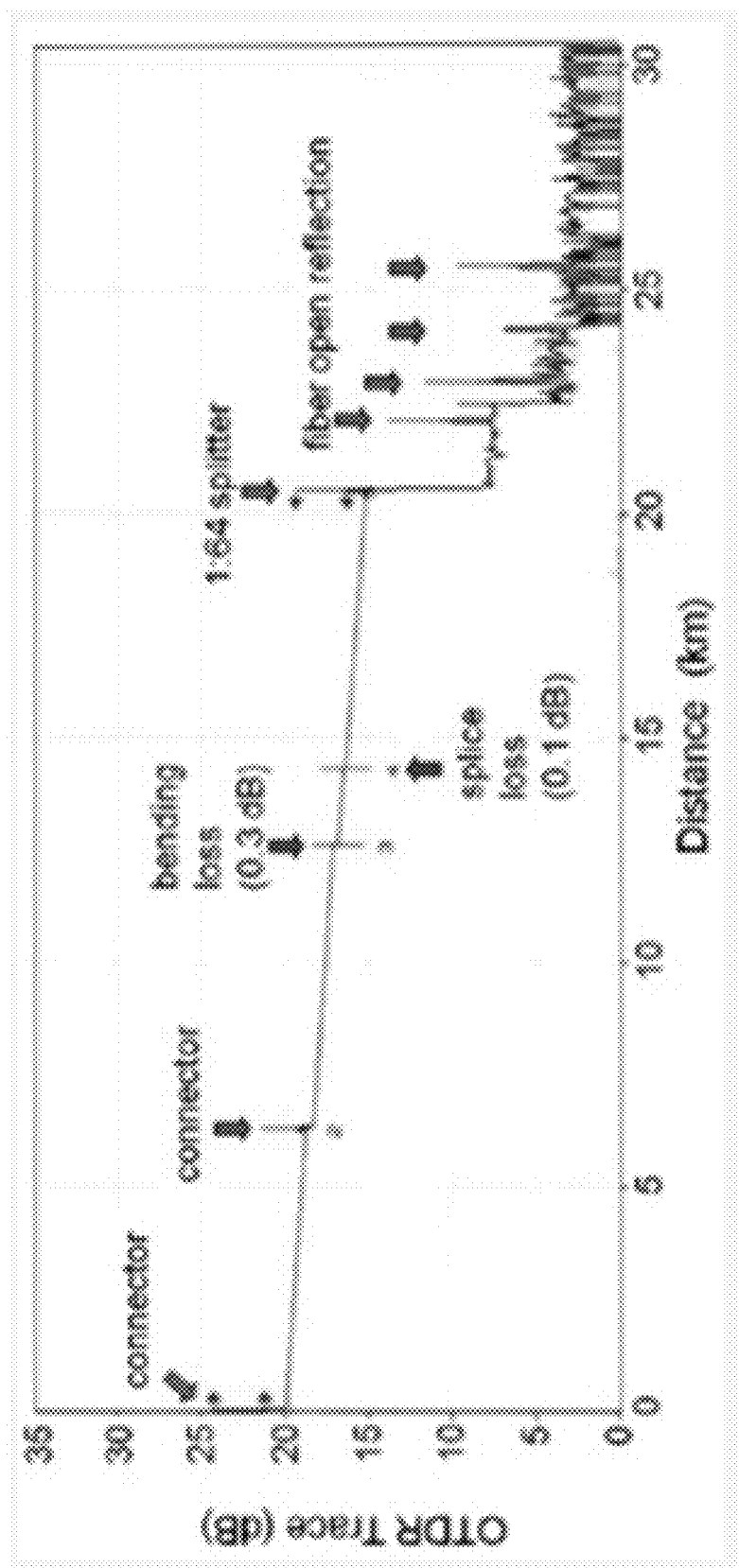
FIG. 8 is a plot of OTDR Trace vs. Distance showing an illustrative OTDR trace indicating fiber losses and network problems according to aspects of the present disclosure.

Notwithstanding such utility and widespread use however, with traditional PON configurations and PONs exhibiting star and tree network topologies, interpreting OTDR traces is difficult, if not impossible. FIG. 8 is a plot showing illustratively OTDR trace power (db) vs. distance (km) indicating fiber loss(es) and network problems including connectors, bending loss, splice(s), and splitter(s). We note that FIG. 8 illustrates a tree topology where features in the OTDR trace longer than the feeder link can be located in any of the 32+ links following the splitter. While OTDR traces are taken first on healthy networks and problems can be detected by comparing current OTDR traces to a baseline, healthy trace, ultimately more measurements must be taken at other locations in the optical distribution network to determine precise locations of any problems.

Figure 9:
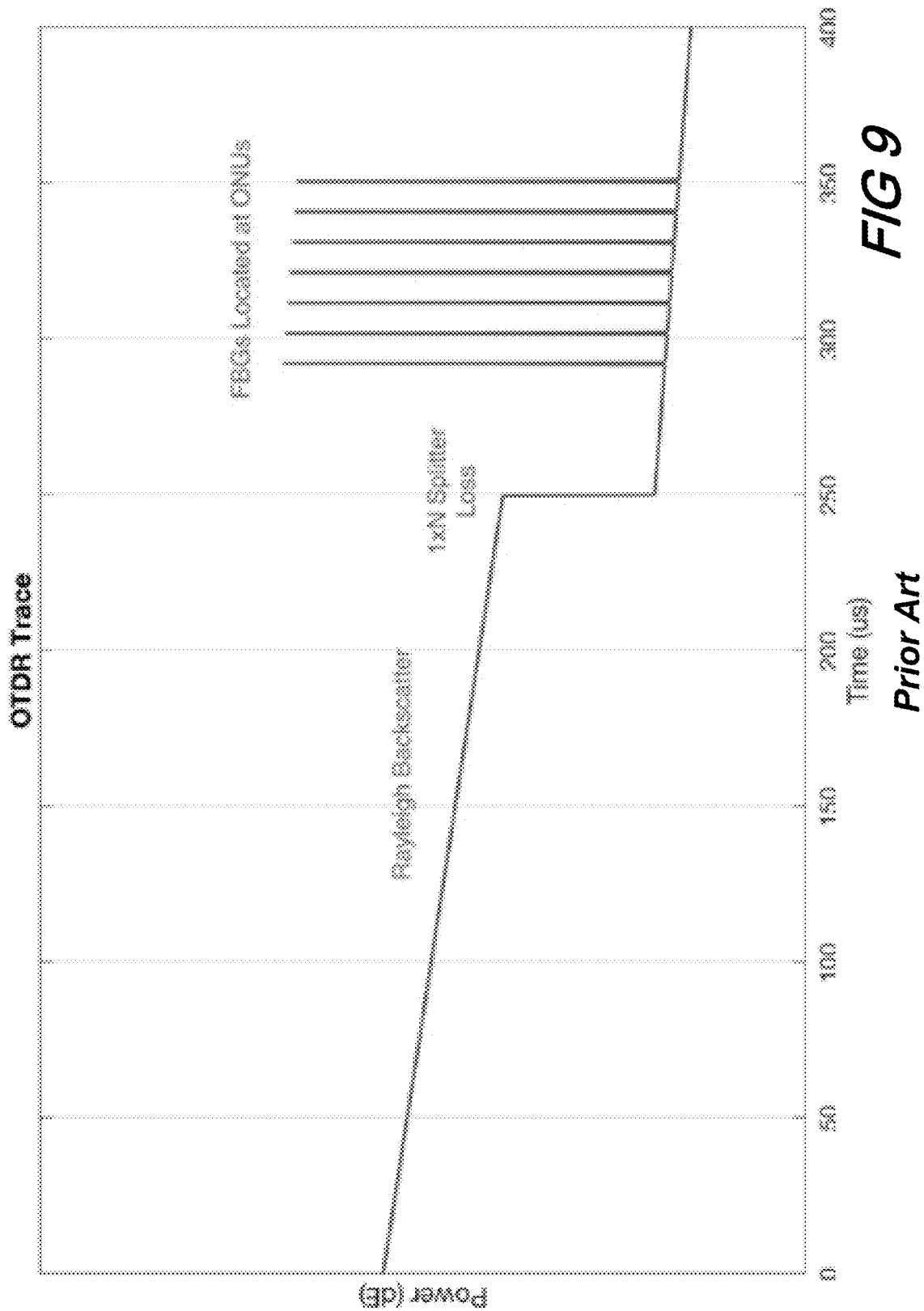
FIG. 9 is a plot of OTDR Trace vs. Power vs. Time showing OTDR trace indicating FBGs placed at ONUs according to aspects of the present disclosure.

At this point we note that FBGs have been integrated into OTDR-based measurement systems to aid in determining network health. Advantageously, FBGs can be placed at the end of the PON links as a part of the ONUs. OTDR traces indicate not only traditional loss information, but now can include discrete reflection events which can be correlated with specific ONUs. FIG. 9 is a plot showing OTDR Trace vs. Power vs. Time for OTDR trace indicating FBG's located at ONUs.

As may be understood with reference to that figure, special care must be taken in designing these networks as each FBG must be placed at distinct distances from the monitoring system such that ONU discrimination can be easily determined. This can cause integration into existing systems difficult.

Active/powered splitters can be integrated at the splitter illustrated in FIG. 9 to aid in discriminating between each ONU link. However, this adds an additional layer of communication, power, and control synchronized to the monitoring system upstream.

Systems utilizing FBGs rely on temperature insensitive wavelength FBG's as each FBG must be located at the same wavelength for a single wavelength OTDR to measure a response from each ONU. In addition, the distances from the splitter to the ONU must be spaced accordingly to allow for sufficient temporal spacing between each reflective event.

WDM PON Monitoring Systems

Tunable wavelength OTDRs integrated with wavelength specific FBGs at each ONU exhibit all of the benefits of a traditional OTDR described above but overcome the difficulty of discriminating between ONUs. These systems carry the additional cost of providing some number of discrete wavelength light sources in the system. Each ONU must be represented by a unique wavelength thus the cost of these type of OTDR scales as the number of required monitored ONU's. Again, we note that this type of OTDR (like in the previous section) must be able to output laser light at a wavelength equal that to the current FBG wavelength. Either temperature insensitive FBG's must be used or a finely (or continuously) tunable laser must be integrated into the system.

Broadband sources and arrayed waveguide gratings (AWG) have been tested to demodulate the monitoring FBG's at the ONU's. This approach successfully reduces Rayleigh as each received channel on the AWG is only affected by the optical bandwidth in its passband but, ultimately is limited by launch power of the light source which is much less than that a laser.

Systems, methods, and structures according to aspects of the present disclosure address a number of the limitations described namely, overcoming the limiting, accumulated Rayleigh backscatter signal in fiber optic systems and networks. As we shall show and describe, this can be overcome by adjusting the operational mode of swept laser sources. Specifically, instead of continually sweeping across the entire, desired wavelength range during each acquisition, a swept laser source is configured to sweep across short spans of the entire wavelength range and the data and/or results are stitched together to provide a bandwidth complete measurement.

Figure 10:
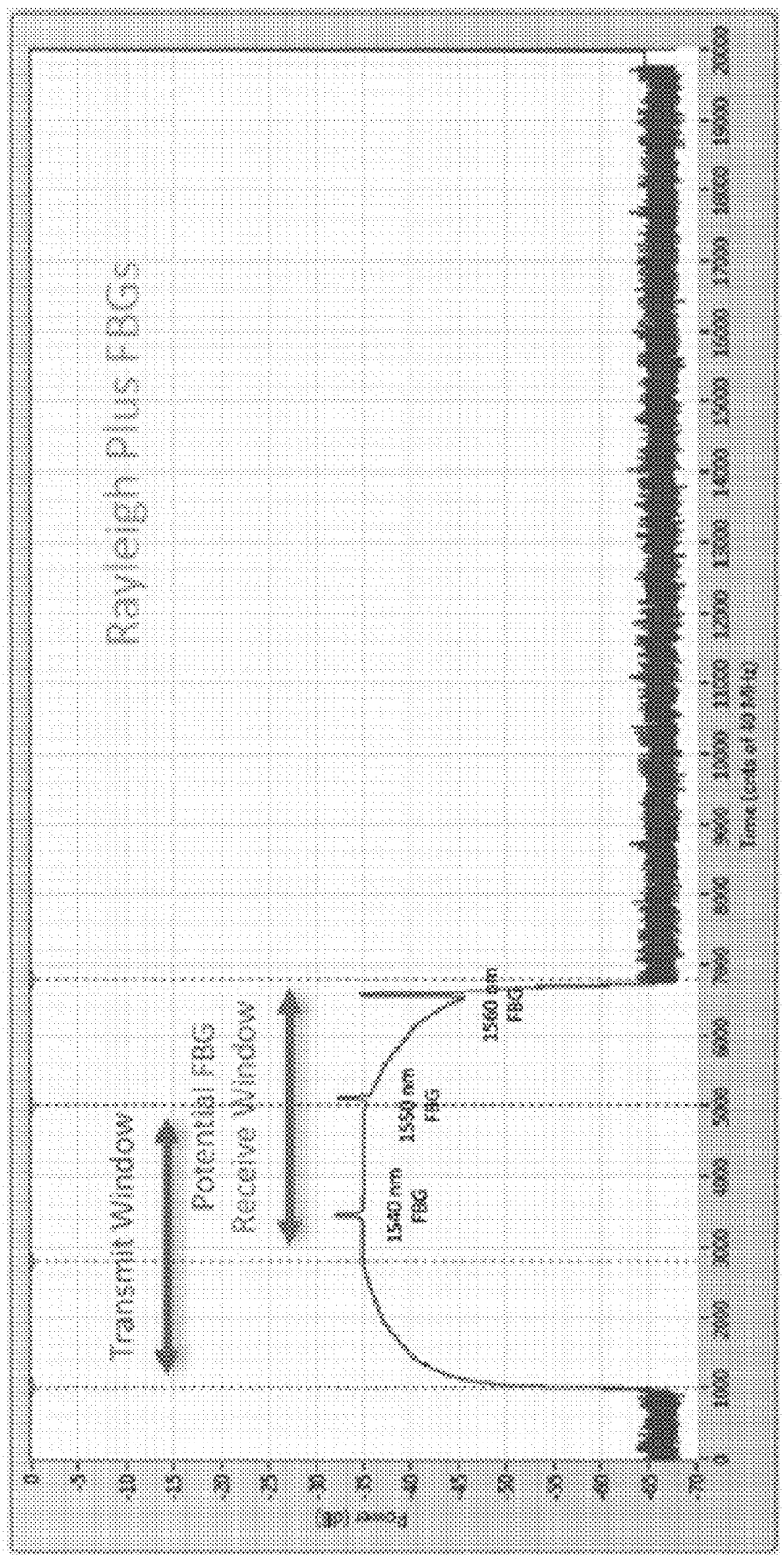
FIG. 10 is a plot of Power vs. Time a showing a swept source example wherein received signals begin to arrive before the end of the laser sweep on a 4.5 km link to a three FBG sensor array according to aspects of the present disclosure.

In another technique according to aspects of the present disclosure, the Rayleigh levels are reduced by reducing the lasing time of the laser to the entire wavelength band of interest. This has some draw backs as it requires the wavelength range of interest to increase and as such the Rayleigh levels increase as well. In addition, the Rayleigh levels may saturate, and sensors experience differing levels of OSNR if positioned too close to the instrument. FIG. 10 is a plot showing Power vs. Time for an illustrative swept source example where received signals begin to arrive before the end of the laser sweep on a 4.5 Km link to a three FBG sensor array. Some of the above-noted drawbacks are illustrated in this figure.

Systems, methods and structures according to the present disclosure only lase over a small bandwidth over which the sensors are located. Sensors, whether close or far away, will not experience saturated Rayleigh levels, and thus, experience equal OSNR levels as illustratively shown in FIG. 11 which is a plot showing Power vs. Time of a reflected spectrum of an abbreviated, short laser sweep across 1550 nm over a 4.5 Km link—according to aspects of the present disclosure.

Advantageously, the laser aspect of the light source ensures a sufficiently high launch power such that the reflected signal is larger than the electronic receiver noise floor. Most importantly, by only launching power in discrete, small spans (the wavelength range of interest), the Rayleigh backscatter signal is significantly reduced. More so, the reflected signals of fiber optic sensing elements (e.g. FBG) located at the farthest points in the network experience the minimum amount of Rayleigh noise floor.

Intentional Minimization of Rayleigh Noise Floor by Abbreviating Swept Laser Span In more traditional, prior art configurations and applications, swept sources sweep the entire bandwidth of interest. For example, in static interrogation systems (where the effects of the speed of light are limited), Rayleigh scatter simply increases the noise floor of the received optical signal. There is little that can be done to overcome this limitation in this type of system.

However, in more dynamic systems where sweep speeds are higher, the received reflected signals can occur well into, or even after, the initial laser sweep. The effects of Rayleigh scatter depend upon the temporal relationship between the laser sweep and the received signals.

FIG. 10 illustrates a case where the transmitted laser sweep overlaps the receive signals of three FBG's. The Rayleigh backscatter signal saturates until the transmit window ends and decays until the end of the receive signal of FBG array. The OSNR of the FBG signals are not equal and therefore detection and discrimination can be difficult. Distance must be corrected, and detection algorithms must take into account the large range in OSNR. In this case, signals can be lost with not only the attenuation due to fiber transmission, but other loss mechanisms (bends, splitters, poor connections, etc.). The signal is greatly improved by modulating the laser sweep across only a short span of wavelength as illustrated in FIG. 11.

In such a case, the FBG signal is clear. The OSNR is high as the Rayleigh scatter is minimized due the reduction in launch energy and temporally received at the minimum Rayleigh signal. Due to the timing of the transmit and receive windows of the laser sweep, the OSNR of the FBG reflected is still Rayleigh limited, not receiver electronic noise limited.

Figure 12:
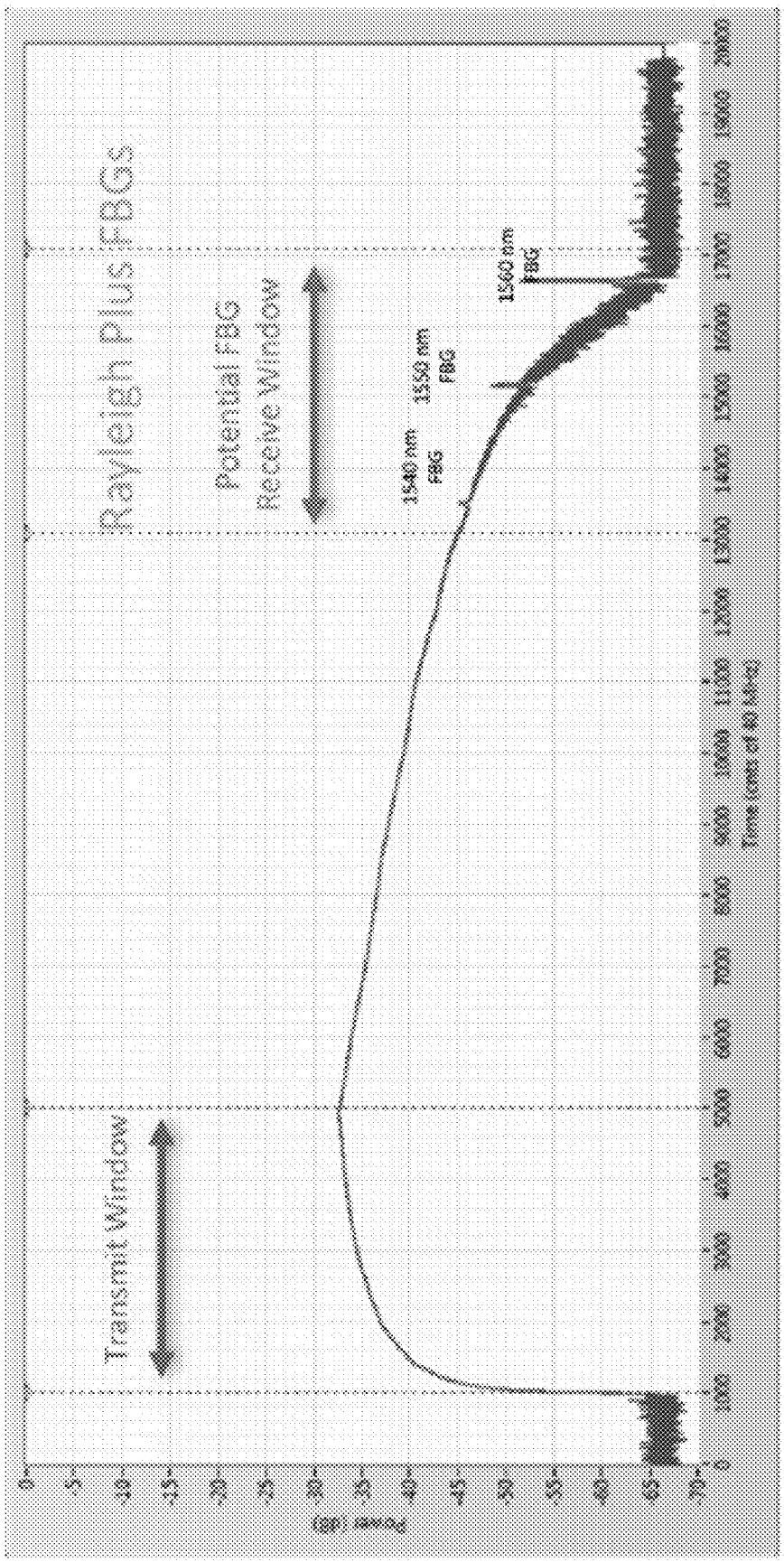
FIG. 12 is a plot of Power vs. Time showing a long link in a full bandwidth swept laser according to aspects of the present disclosure.

Note that as the link length gets longer, OSNR reduces even more in traditional swept laser source systems as illustrated in FIG. 12—which is a plot of Power vs. Time for a long link in a full bandwidth swept laser system. Note further that the intentional reduction of Rayleigh scatter with this method maintains a high OSNR even at very long links lengths as illustrated in FIG. 13—which is a plot of Power vs. Time for a long link in a short, abbreviated swept laser system.

Figure 11:
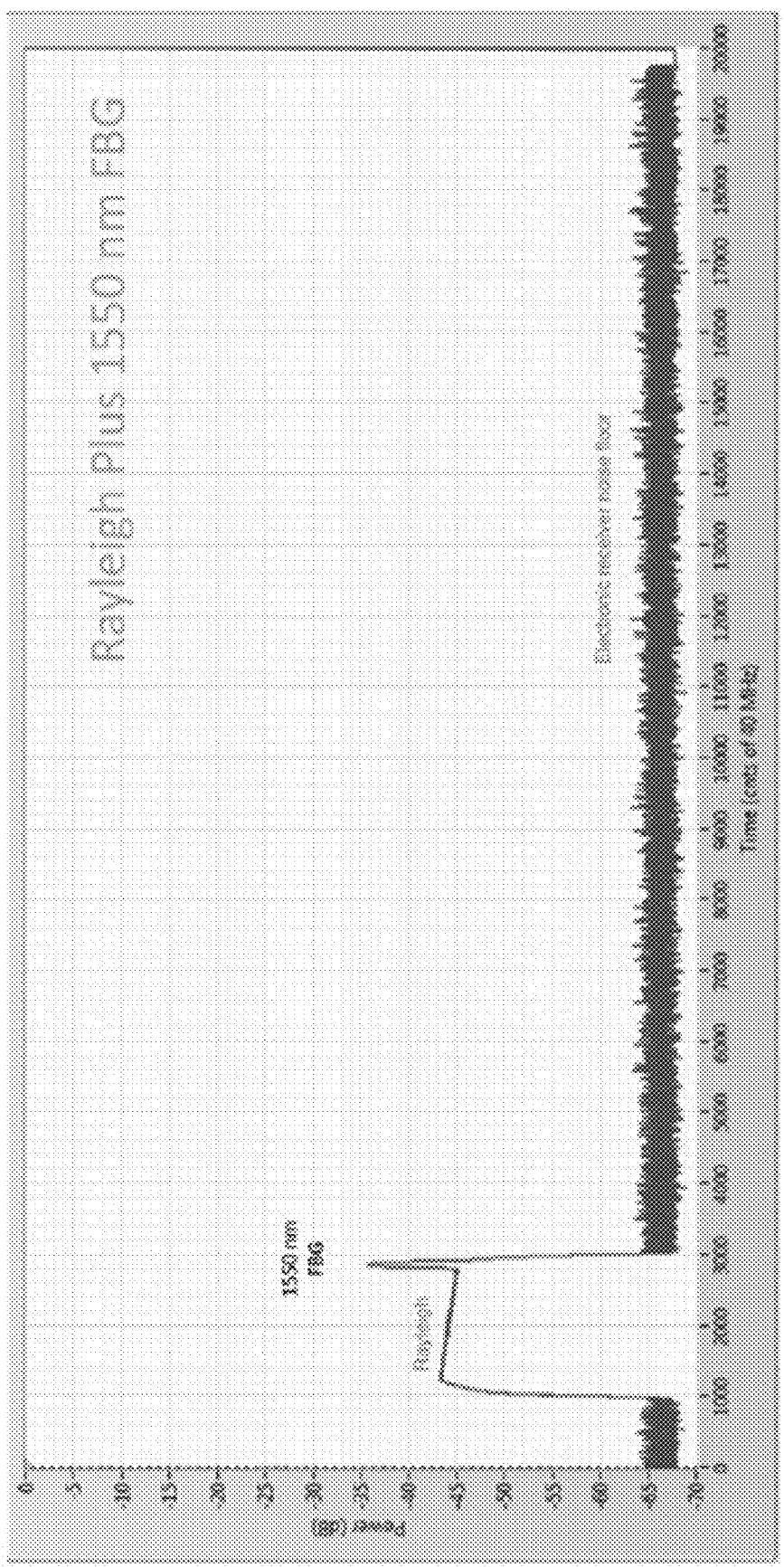
FIG. 11 is a plot of Power vs. Time showing a reflected spectrum of an abbreviated, short laser sweep across 1550 nm over a 4.5 km link according to aspects of the present disclosure.
Figure 13:
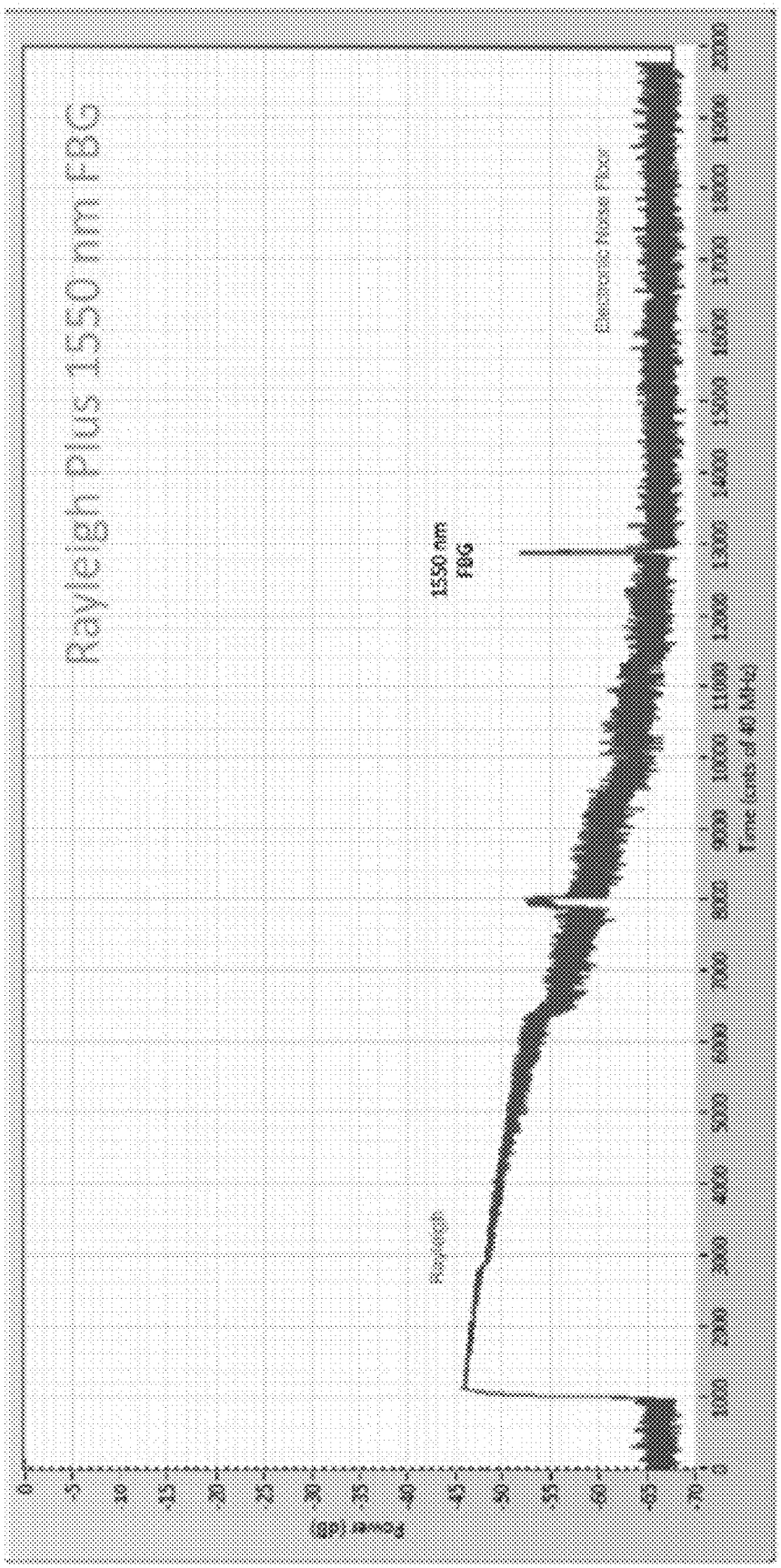
FIG. 13 is a plot of Power vs. Time of a long link in a short, abbreviated swept laser system according to aspects of the present disclosure.

As will be appreciated by those skilled in the art, FIG. 11 and FIG. 13 illustrate just one sub-span of the entire available bandwidth given the swept laser source available. These traces can be taken at many abbreviated wavelength spans and their results merged. There is advantage in scanning these systems quickly as static measurements exhibit saturated levels of Rayleigh noise. As illustrated in FIG. 11, FIG. 12 and FIG. 13, the Rayleigh reduces before any sensor signal can be received. Systems scanning as high as 1 kHz could aggregate and return data on the entire bandwidth in seconds.

Figure 14:
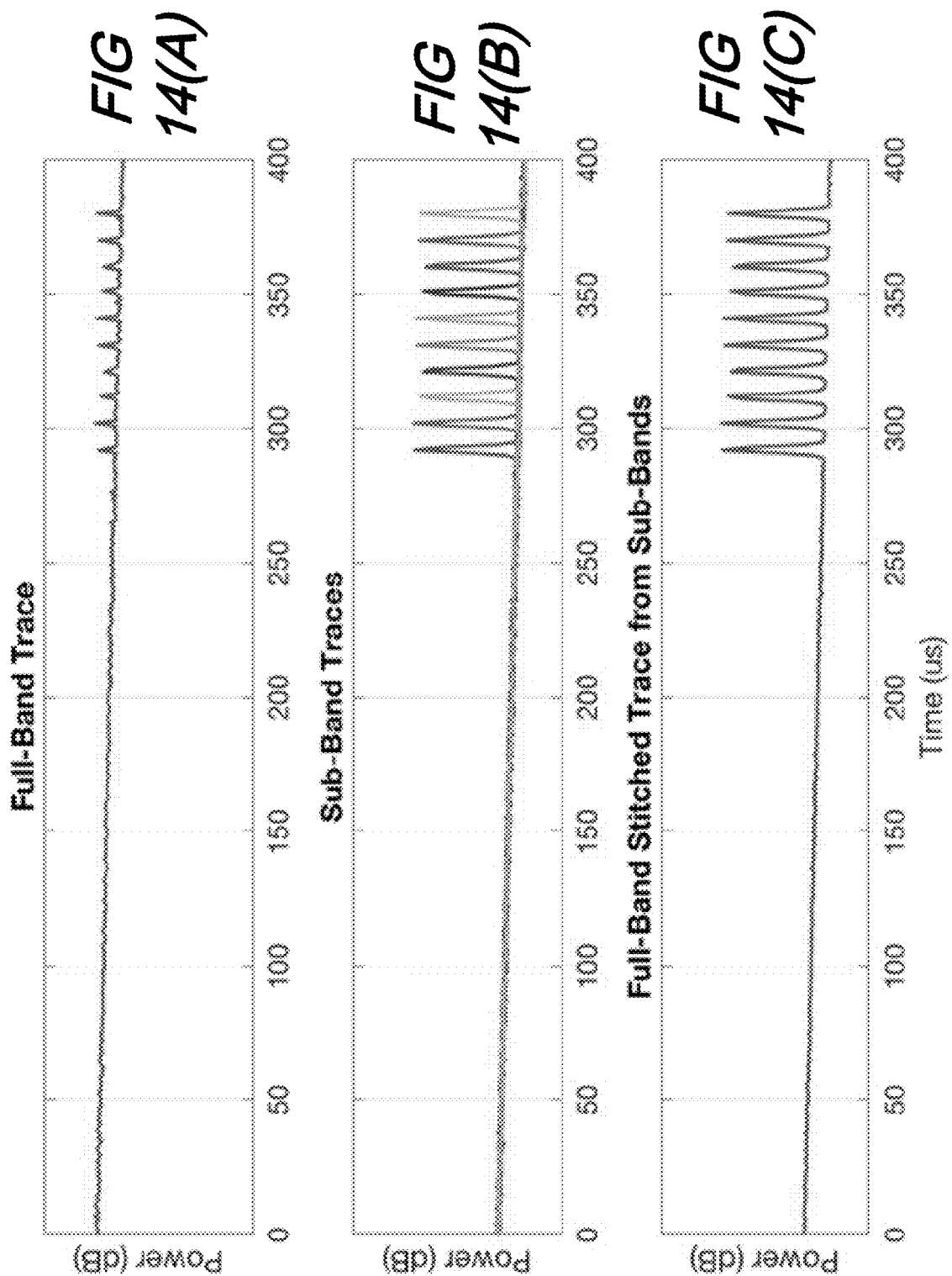

FIG. 14(A), FIG. 14(B), and FIG. 14(C) illustrate this process. With reference to that figure there is shown a series of plots of Power vs. Time for: FIG. 14(A), Full-band swept source trace with elevated Rayleigh noise floor; FIG. 14(B), subband swept source scans centered about 10 FBG wavelengths with lowered Rayleigh noise floor; and FIG. 14(C), peak hold of sub-band scans aggregated into a full band response.

The FIG. 14(A) plot illustrates the received response of a 10 FBG sensor array where a swept laser source sweeps the entire wavelength band of interest during each acquisition. Because the launch energy is high, the Rayleigh noise floor is high when each FBG's reflected response is received at the interrogation system. The FIG. 14(B), plot illustrates 10 sub-band responses centered about 10 individual FBG's located at near the end of a system link. Because each acquisition is the result of a temporally short, sweep of light center about each FBG wavelength, the Rayleigh noise floor is smaller than the FIG. 14(A). Given the data gathered from 10 acquisitions, a full-band response (also illustrated in the FIG. 14(A) plot) is aggregated by a simple peak hold between plot the 10 traces resulting in a response with much lower Rayleigh noise floor than the top plot.

This approach also accounts for the potential for sensor responses to overlap temporally in the received response. For example, if a larger wavelength sensor is positioned closer to the interrogation system than a lower wavelength sensor, there is potential for the responses to overlap in time. However, with this approach, as long as each sensor is at a unique wavelength band, the sensor response can be measured separately with each sub-band sweep.

Figure 15:
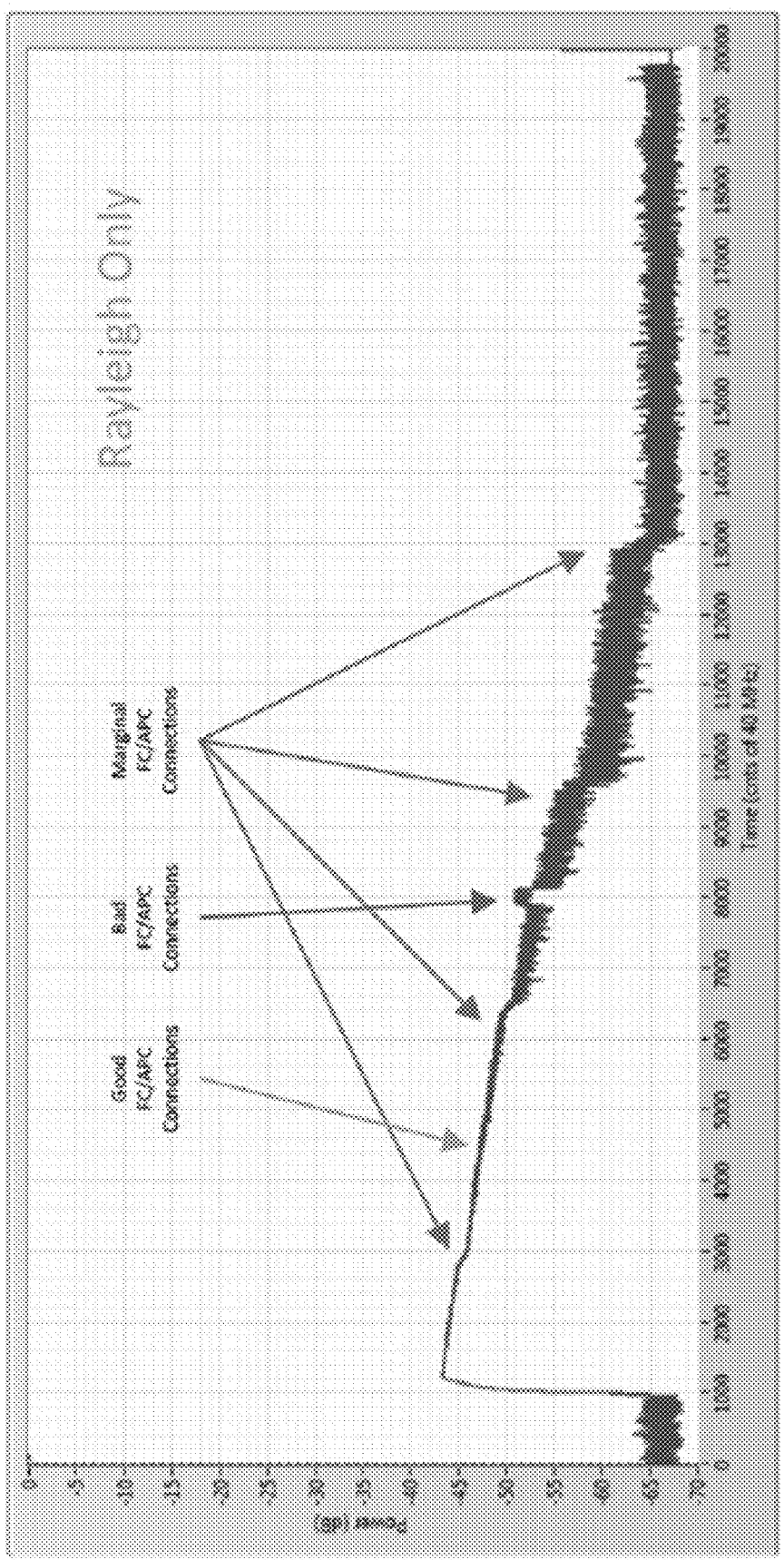
FIG. 15 is a plot of Power vs. Time of a trace resulting from abbreviated swept source illustrating discrete link loss events according to aspects of the present disclosure.

Use of Abbreviated Swept Source Reflection Spectrum to Extract OTDR Trace Information The use of short pulses of swept laser light advantageously provides functionality similar to that of traditional OTDR. In such case, traditional OTDR evaluation techniques be utilized to analyze the resulting traces to determine more information on the overall health of the optical link. FIG. 15 illustrates the OTDR trace artifacts that can be determined from this method. With reference to that figure, there is shown a plot of Power vs. Time for a trace resulting from abbreviated swept source illustrating discrete link loss events. This figure shows an identical situation as illustrated in FIG. 13 without the FBG reflected response for clarity.

At this point in our discussion we note that with increasing deployment come increasing operational costs for network failure detection and correction. Accordingly, solutions to quickly identify the location and distance to fiber faults at any possible failure point in the network are desirable and welcome.

Figure 16:
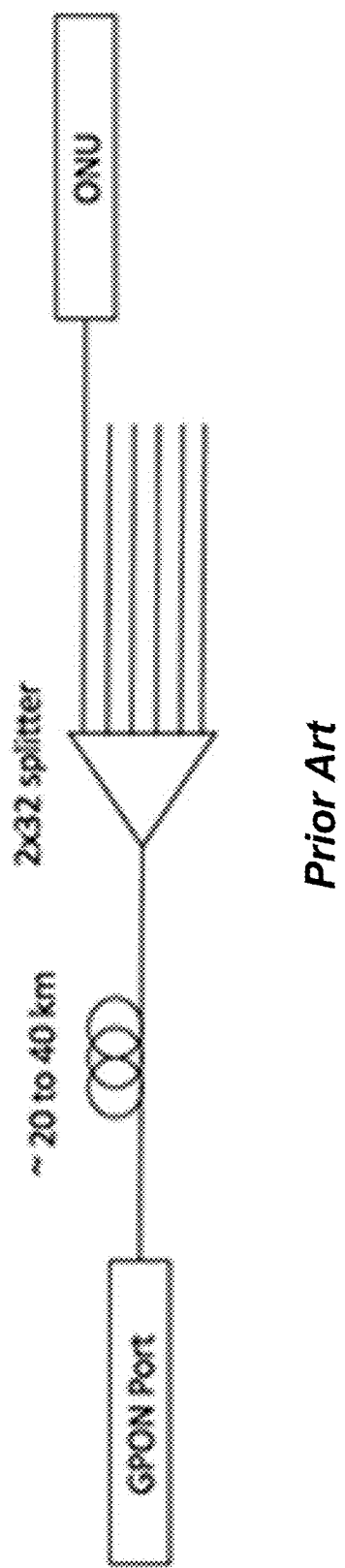
FIG. 16 shows a schematic illustrating a generic gigabit passive optical network (GPON) port connection to 32 optical network units (ONUs)

FIG. 16 illustrates a schematic of a generic gigabyte passive optical network (GPON) network. As in known and shown in the figure, a single 1550 nm range GPON port from a central office (optical network terminal—ONT) is coupled to a lead-in fiber with a length that may vary anywhere from ~5 km up to 20 or even 40 km. That lead-in fiber is connected to a 32 way splitter, each fiber exiting the splitter being connected to a terminal unit in a home or business (the optical network unit—ONU)

As will be readily appreciated by those skilled in the art, a traditional method to deal with a loss of service at an ONU is to release a truck roll (service call) to the home or business and apply a visible laser continuity checker to shoot light back through ONU, through splitter, back to a collaborating troubleshooting engineer at the OLT. If a lack of continuity is confirmed, a traditional portable OTDR field measurement unit is then used by a field engineer to pinpoint the location of the break.

One issue with this prior art method is that diagnosis requires a costly truck roll by the network maintenance team/service provider. This process of manual, on-site diagnosis becomes even more problematic in circumstances where the owner/operator of the network infrastructure is not the same entity as the service provider to the home or business. Especially in this circumstance, the network infrastructure operator is highly motivated to have a perpetual assurance from the OLT that the network is fully operational without the need for a costly field engineer affirmation.

Figure 17:
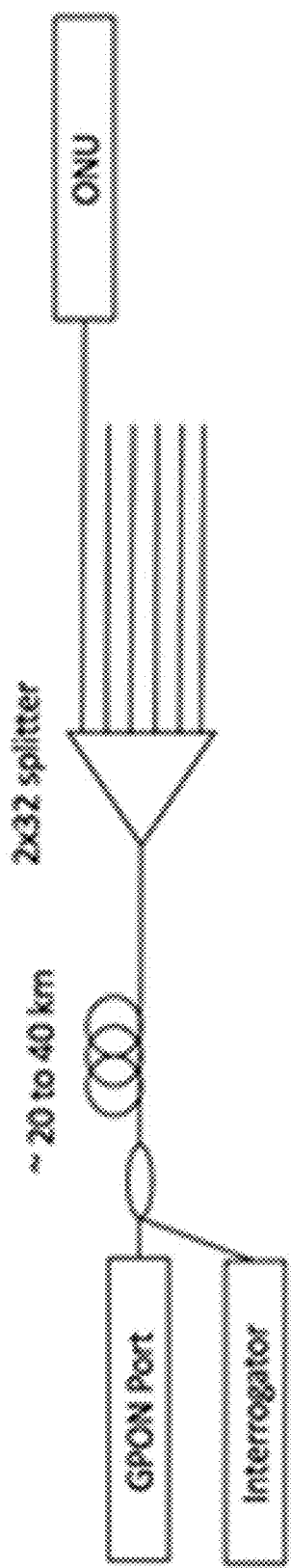
FIG. 17 shows schematic illustrating an interrogator wavelength-division multiplexed (WDM) coupled into the GPON network to monitor and locate fiber failures.

As will be further appreciated by those skilled in the art, this desired functionality has been implemented by a number of technologies in a generic architecture as illustrated by FIG. 17, where by an "interrogator" unit is coupled onto the lead-in fiber alongside the GPON signals by means of a wavelength division multiplexing (WDM) coupler. The notion is that the Interrogator will use light signals at wavelengths other than the GPON traffic signal wavelengths to monitor for and (ideally) locate the exact fiber location of a failure anywhere in the GPON fiber network.

To date, there have been a number of proposed solutions for active, online monitoring solutions for GPON networks.

Traditional OTDR Break Detection

One approach to online monitoring uses of traditional Optical Time Domain Reflectometer (OTDR) measurements systems. OTDR systems are a proven and widely deployed technology for locating fiber breaks or other faults in fiber communication links. The technology is mature, widely accepted and broadly used. In the GPON monitoring application, however, the technology exhibits several limitations.

First, as a time-domain measurement, there is no direct means for differentiating fiber failure events on parallel fiber paths, as would be required in the GPON network monitoring application. Stated differently, if a break were to be detected on the GPON network depicted in FIG. 17 at a distance that is known to be after the 32-way splitter, there is no intrinsic means with an OTDR of determining with certainty which fiber experienced the break.

And while there are techniques to direct the OTDR measurements directly to each particular fiber, such methods involve costly optical switches and the requirements for parallel runs of optical fiber along the terminal lengths to the ONUs. This increase of cost and complexity, with the intrinsic reliability issue of introducing optical switches in either network or network monitoring architectures renders OTDR technology less than ideal for the GPON monitoring application.

OTDR Plus Fiber Bragg Gratings (FBGs)

Figure 18:
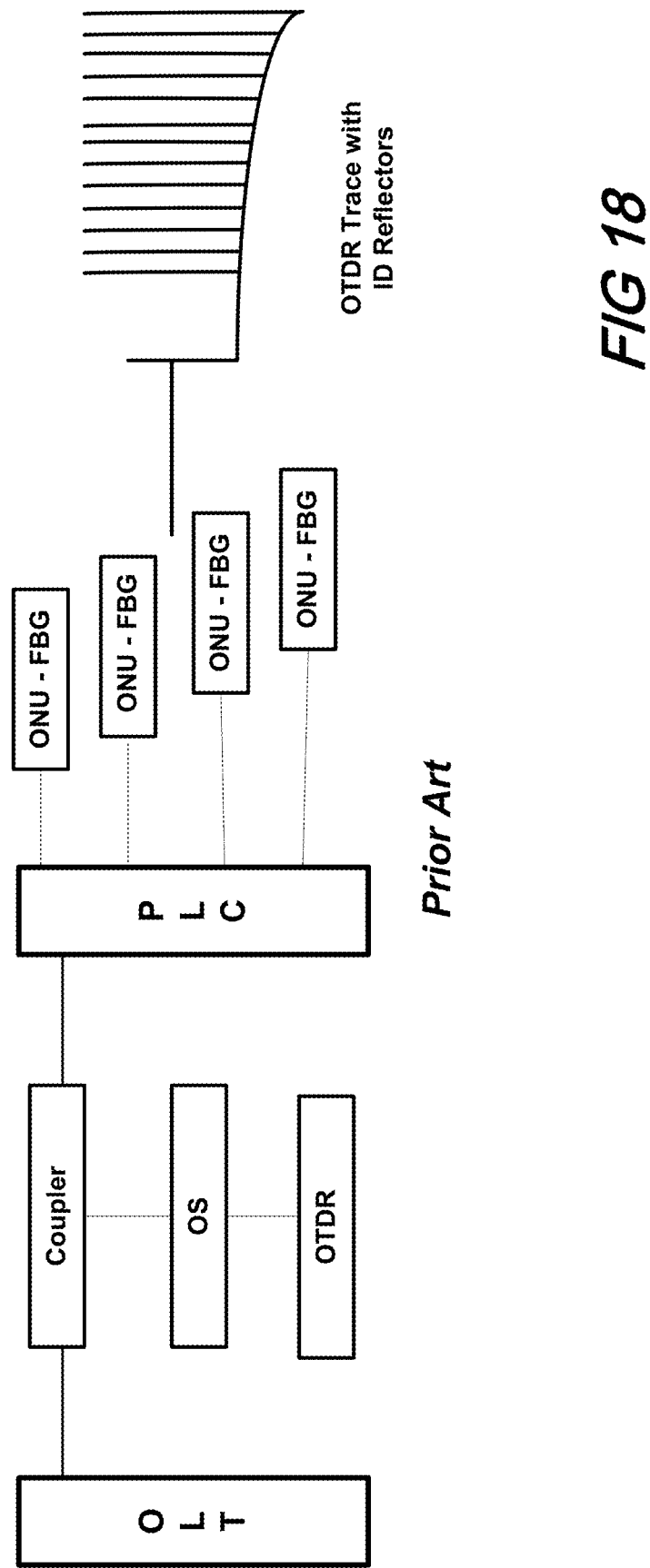
FIG. 18 shows a schematic of a combined OTDR and FBG GPON monitoring.
Figure 18A:
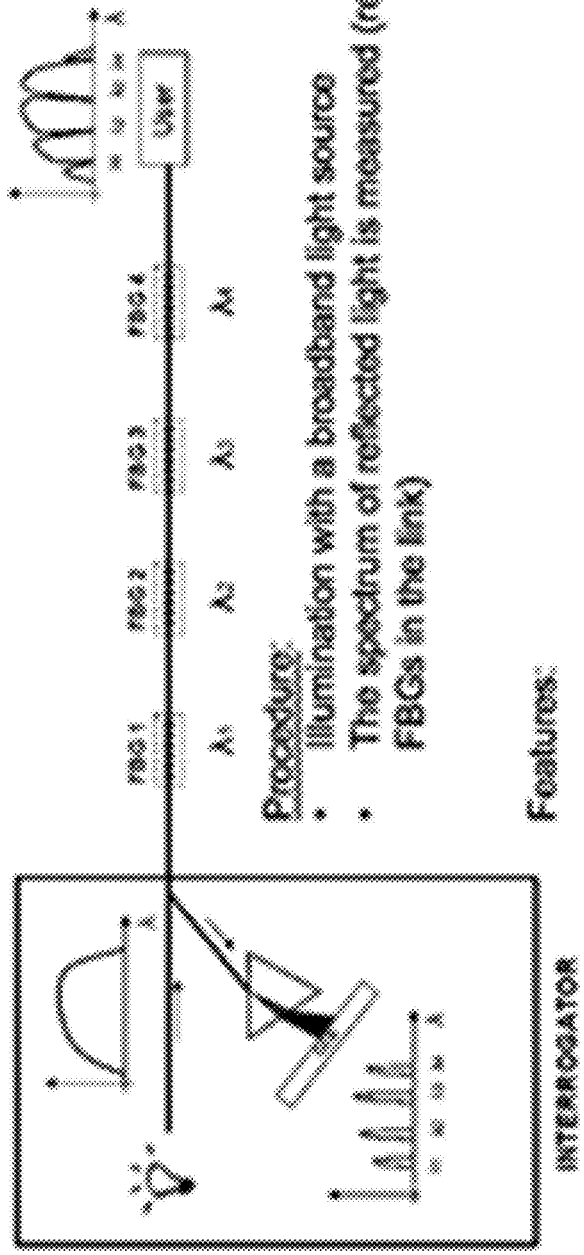
FIG. 18(A) shows a schematic of an 850 nm WDM spectrometer implementation of FBG PON monitoring system.

In addition to the use of optical switches, another known method creates unique markers for an OTDR system through the use of Fiber Bragg Grating (FBG) reflector components at the ONU. In such an architecture, each ONU is outfitted with an FBG of an identical wavelength, but a unique length of fiber from a 32-way splitter to the ONU and its FBG, as shown in FIG. 18. Note that on the right side of FIG. 18, a trace of resulting OTDR "peaks" allows for positive affirmation of the presence of a visible FBG at each ONU. FIG. 18(A) shows a schematic of an interrogator—a relatively simple device used to read an OLID code.

Though this method does offer a means for an OTDR solution to individually monitory GPON fiber paths all the way to the individual ONU, it does so at the expense of installation/operational complexity, effectively creating very tight fiber length tolerance requirements on the installation crews that must be planned, executed, and documented with little margin for error. In practical application, these requirements may render this solution less than economically and operationally desirable.

WDM Monitoring of FBG ONU Markers Solution

Yet another application of FBG markers on an ONU has been applied with detection the demarcating FBG reflectors in the wavelength domain (WDM detection) rather than in the time domain, like the OTDR solution. In this approach and as shown illustratively in FIG. 19, each ONU FBG is deployed at a unique wavelength such that breaks on any particular fiber between the splitter and the ONU will be registered by the absence of a detected wavelength marker at the specific assigned wavelength of that ONU. Should the interrogator report that none of the ONU FBGs are detected, the implication would be that the fiber break is somewhere between the OLT and the splitter.

While this approach does require a unique wavelength to be deployed for each ONU on a monitored PON port, it does not carry with it the fiber length management requirement of the OTDR/FBG solution.

This approach, though appealing in architecture and functionality cannot be deployed for GPON installations for the following two reasons. 1) The referenced system is 850 nm based and not 1550/1650 nm compatible, and 2) the broad band source/diode array architecture do not possess the total dynamic range required to detect and identify FBG ONU markers over the distances and split ratios required by GPON standards.

Those skilled in the art will appreciate that a desirable solution would have the individual wavelength demarcation capabilities of the WDM FBG solution with the break location detection capabilities of OTDR solutions, without requiring additional optical fibers, switches, or specific optical path length requirements for each ONU connection.

Use of 1550 nm High Dynamic Range Swept Laser Interrogator

To address some of the 850 nm WDM FBG monitoring approach shortcomings for GPON monitoring applications, a swept wavelength laser sensor interrogator architecture can advantageously be deployed.

Notably, a swept wavelength laser Interrogator can replicate the unique FBG path detection functionality of 850 nm OLID system at 1550 nm (C+L band) or 1650 nm (U band) wavelength ranges. Advantageously, this approach solves both the wavelength compatibility and fiber distance requirement issues with respect to the GPON standard.

Figure 19:
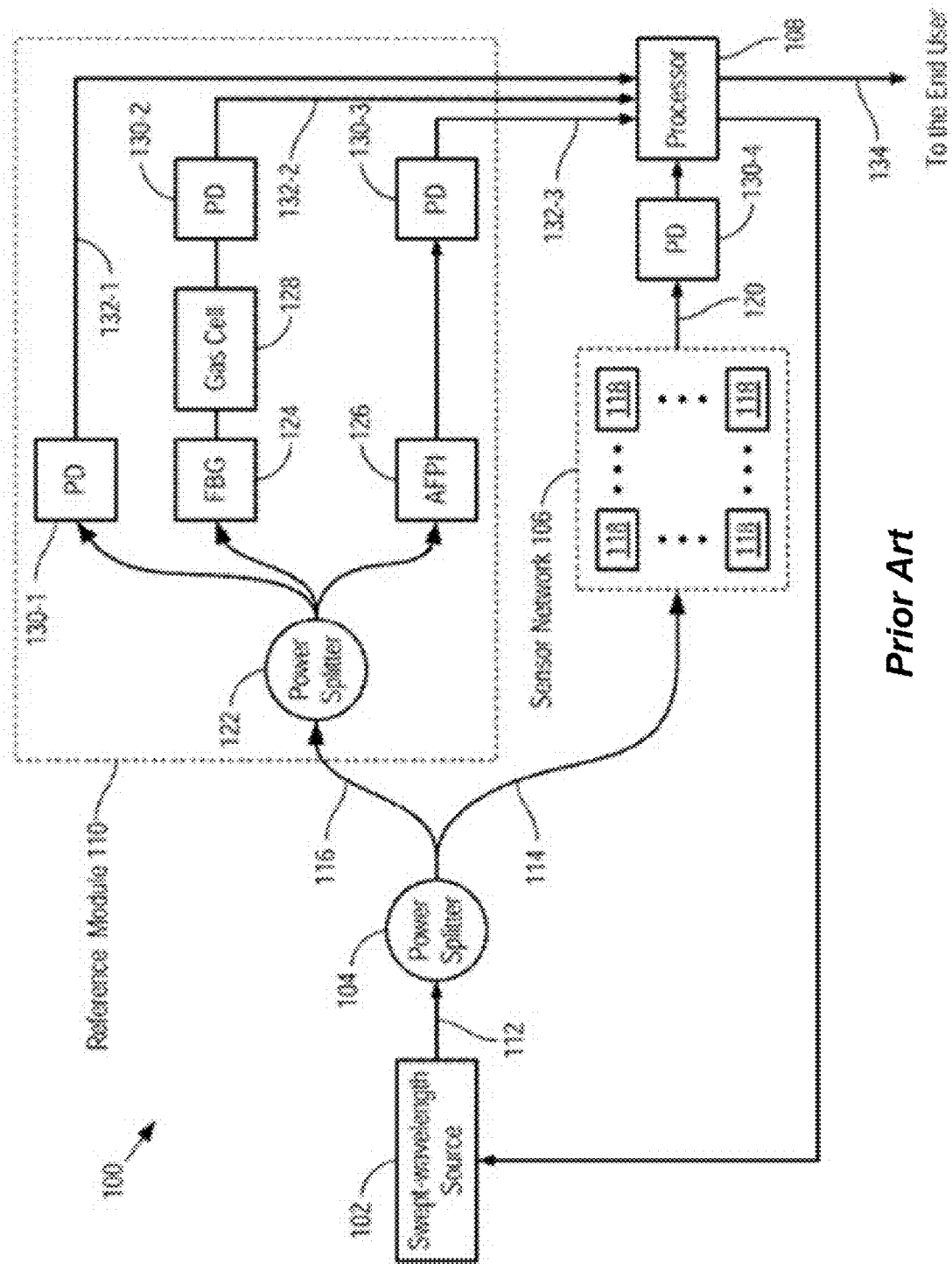
FIG. 19 shows a schematic of a swept wavelength laser FBG interrogator.

FIG. 19 shows the basic architecture of such a system, and its use for monitoring FBG sensors across a wide swath of fiber length, loss, and splitter/coupler architectures are well documented in the literature and well understood by those skilled in the art.

When deployed at GPON compatible wavelengths and supporting the lead-in fiber and coupler losses inherent the GPON standard, the swept wavelength laser interrogator method for GPON monitoring offers many of the same benefits to the network operator that the OLD system(s) of the prior art offers for 850 nm networks, including: cost savings during installation (instead of red light check): quick check of line integrity, service cost reduction, support for and during service interventions, quick and individual ROI due to individual procedures and local cost structure, and clear advantages for installation, documentation and service.

There is, however, an additional consideration and potential limitation of the swept laser interrogator method for GPON FBG monitoring that, if unaddressed, can severely limit the effectiveness of the system.

Figure 20:
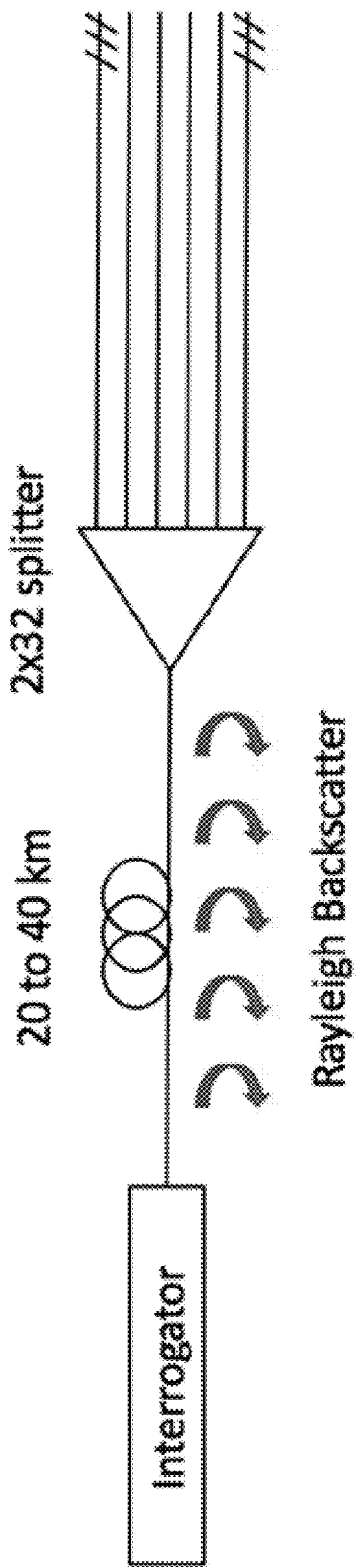
FIG. 20 shows a schematic of a simplified monitored GPON network (GPON pot and WEM omitted) illustrating Rayleigh backscatter before a splitter according to aspects of the present disclosure.

In practice, high intensity instantaneous swept wavelength laser power sent over a long length of lead-in fiber can result in an appreciable degree of backscattered energy that is detected by the integrating photodiode of FIG. 19. The backscatter effect and the location in the network from which it come is depicted in FIG. 20.

Figure 21:
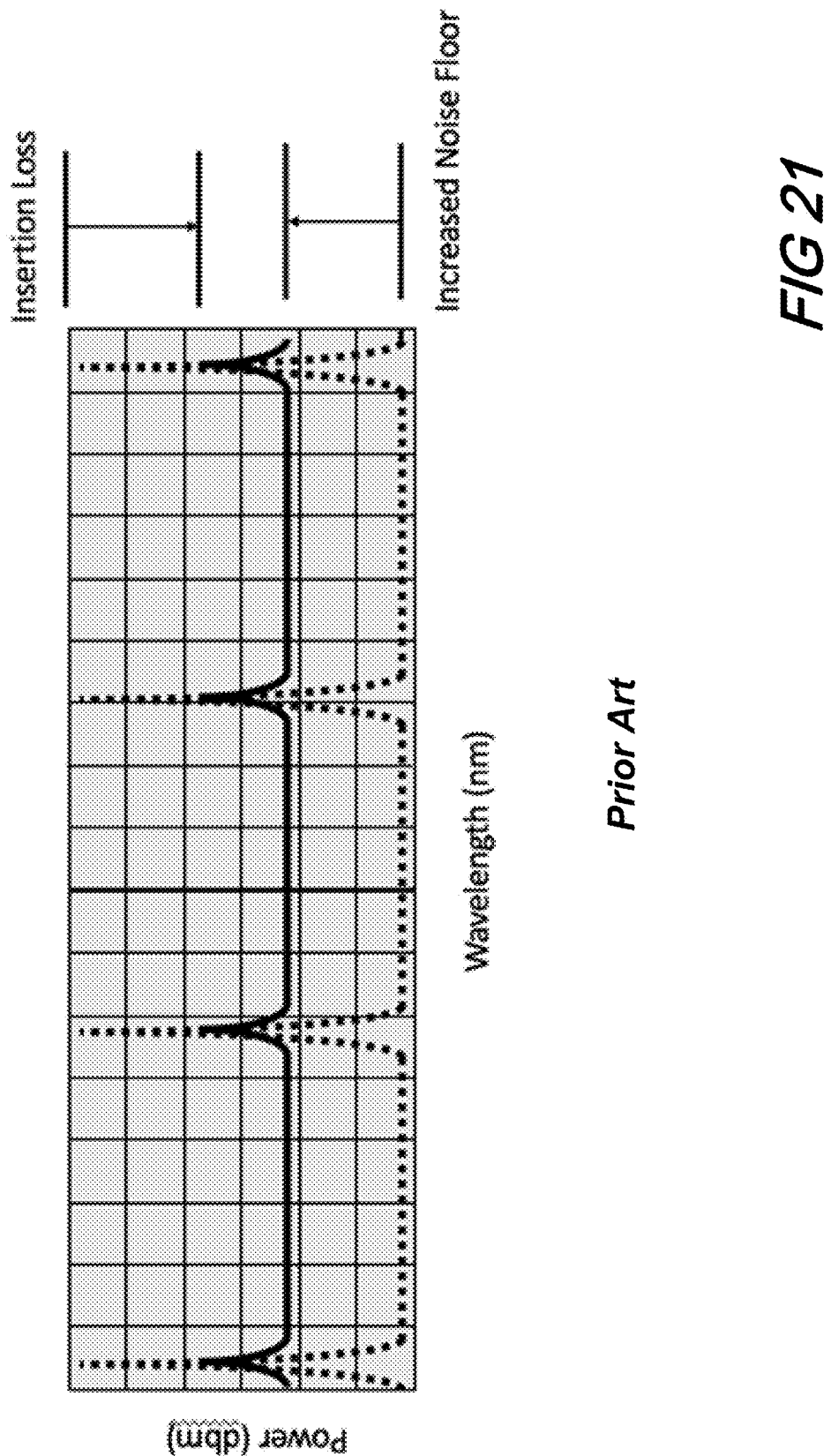
FIG. 21 shows a plot illustrating lead in fiber increases noise floor and decreases peak amplitudes of the FBGS, severely limiting SNR and thus reach according to aspects of the present disclosure.

FIG. 21 shows a combined system limitation of concurrent Rayleigh backscatter from the lead-in fiber, which increases the noise floor of the detection system, with the Insertion loss resulting from both the loss of the lead in fiber and from the 32-way splitter. In practice, when left unmitigated, this backscatter effect will limit the use of a low speed (1-10 Hz) or standard configuration of high speed (1000-5000 Hz) swept laser FBG interrogator in this application to a maximum of ~10 km for a 32 way splitter, rendering the technology incompatible with the requirements of the GPON standard.

In sharp contrast to the prior art attempts described, the present invention of the instant application both mitigates this issue and leverages the underlying effect of that limitation to yield even greater monitoring coverage of GPON network fiber failure modes, the combination of these two techniques offering a novel and non-obvious combination of capabilities that yield a functional and standard compliant solution for GPON network monitoring.

Intentional Temporal Separation of Share Wavelength Noise and Demarcation Signals The method to mitigate the SNR limitations of FIG. 21 are inspired by a technique to address a similar (though not identical) challenge for field sensor networks known in the literature.

In this work, a method is described to compress the time over which the swept wavelength laser sweeps its spectrum range to a small fraction of the total data acquisition time window of the system, effectively gating the swept laser on/off in order to allow the Rayleigh backscatter and FBG signals to decay at same rate, there by (assuming sufficient dynamic range of the detection circuit) preserving SNR of FBG sensors. FIG. 22 shows and image of this system in practice.

Figure 23:
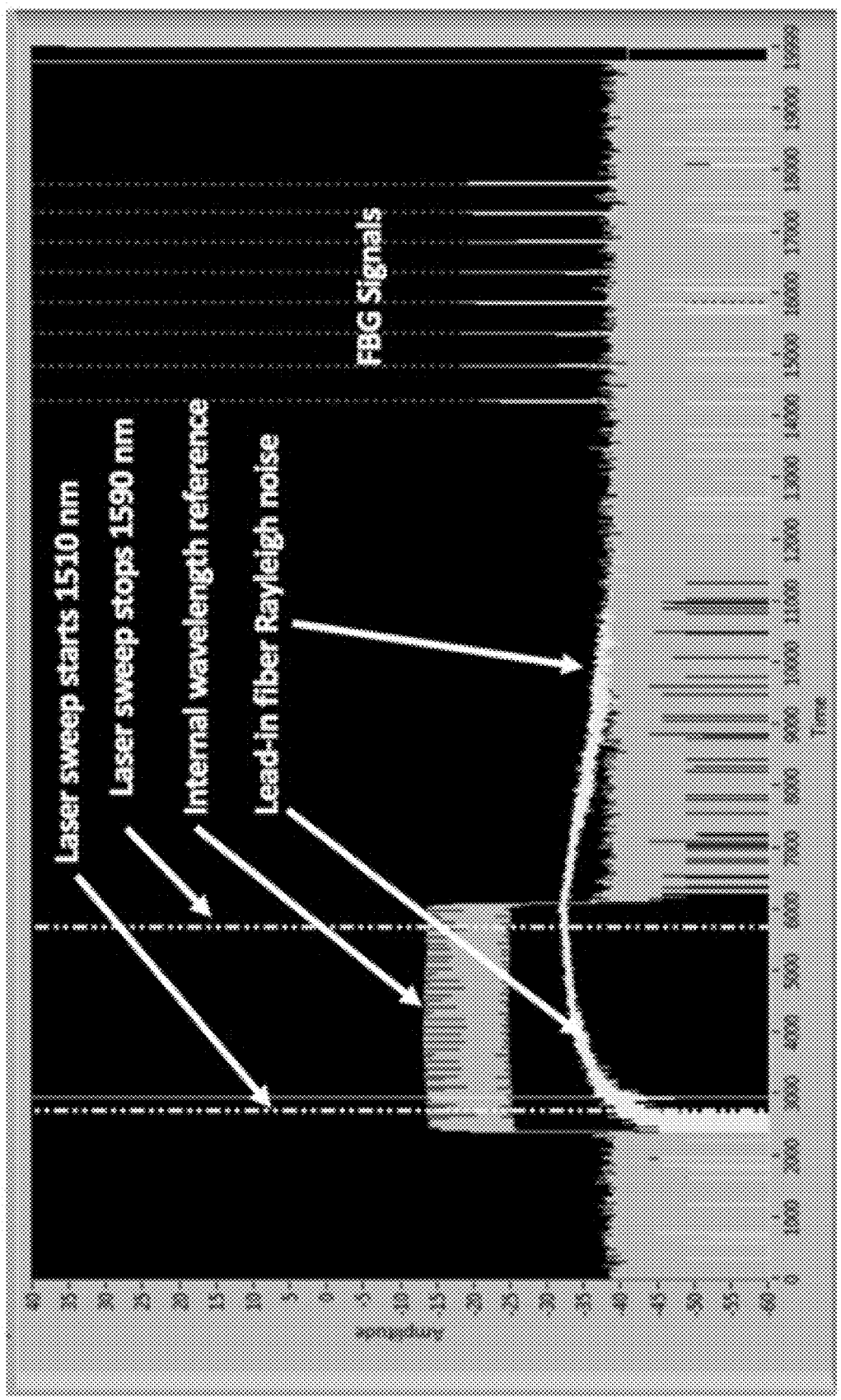
FIG. 23 is a plot illustrating internal laser control and timing diagram, showing intentional separation of Rayleigh and FBG sensor signals in time according to aspects of the present disclosure.

The architecture supporting an illustrative embodiment of the present invention (ring laser architectures apply a similar methodology of accelerating the laser slew rate of a dynamic (1 kHz) interrogator and scheduling that sweep within a small fraction of the available data acquisition timing window, as is shown by the "laser sweep starts . . . and . . . stops . . . " labels on FIG. 23.

Unlike the prior art method(s), however, the gating methodology is not used to maintain a constant SNR over the length of the fiber and a distribution of FBG sensors along its length. Due to the fixed architecture of the FBG monitored GPON network of FIG. 5, all the desired FBG measurements will arrive during a time window that can be intentionally delayed relative to the broad spectrum of back reflected Rayleigh signal.

Figure 24:
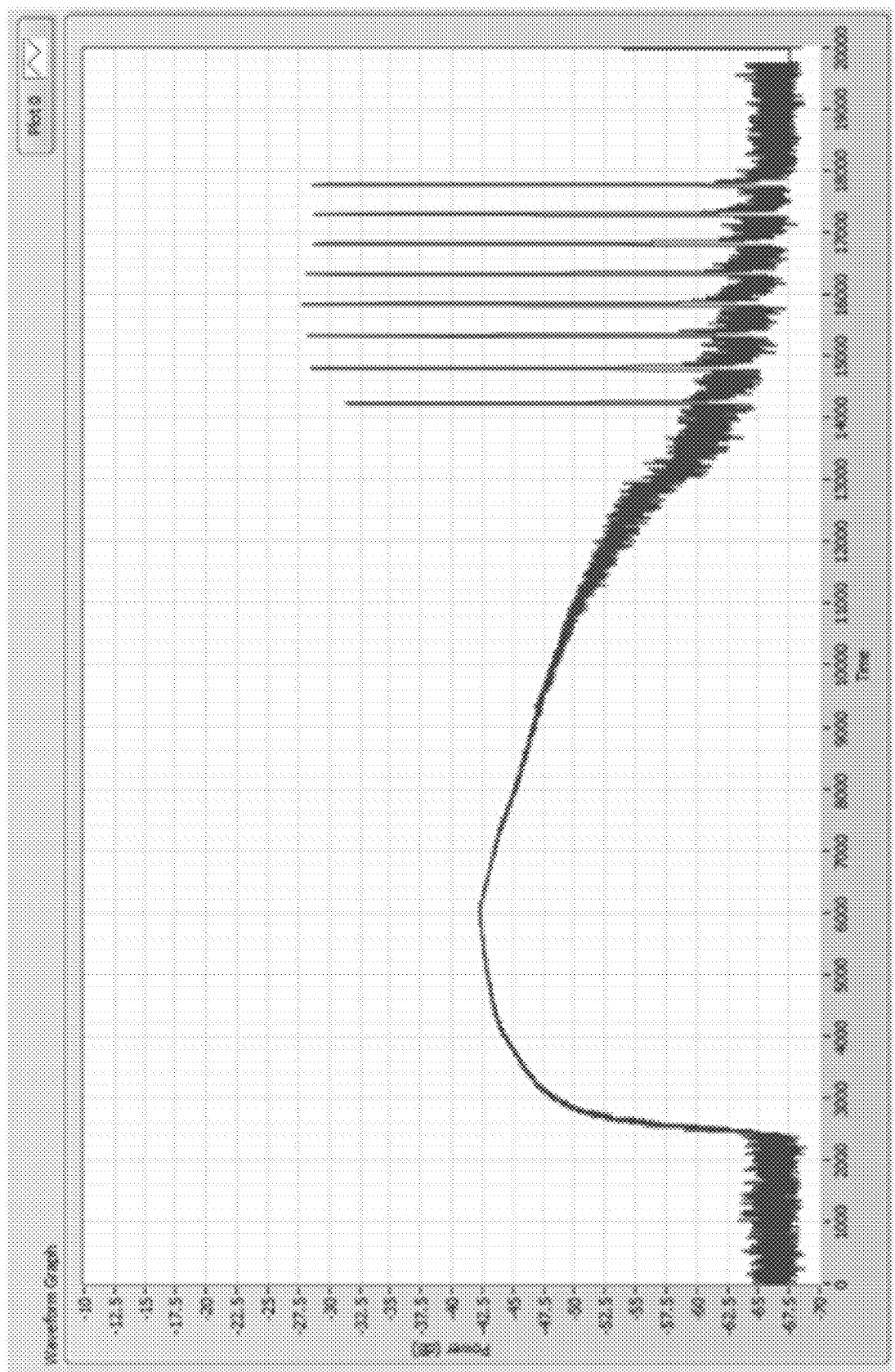
FIG. 24 is a plot showing power calibrated and averaged signal trace (not yet wavelength calibrated) the intentional temporal separation of Rayleigh noise and FBG signals of largely overlapping wavelength components according to aspects of the present disclosure.

According to an aspect of the present disclosure, is the intentional configuration of the drive sweep circuit timing, along with the emitted wavelengths of the swept source interrogator and wavelength/physical distance placement of the ONU monitor FBGs such that the Rayleigh signal and FBG sensor signals are intentionally separated in time even though they share largely overlapping wavelength space. By doing so, a full dynamic range of detection of those FBG signals can be deployed to overcome the losses of the 32-way splitter independent of any Rayleigh backscatter that may be returned from the lead in fiber. This temporal separation is cleanly illustrated by the power calibrated and averaged spectrum trace of FIG. 24.

Figure 25:
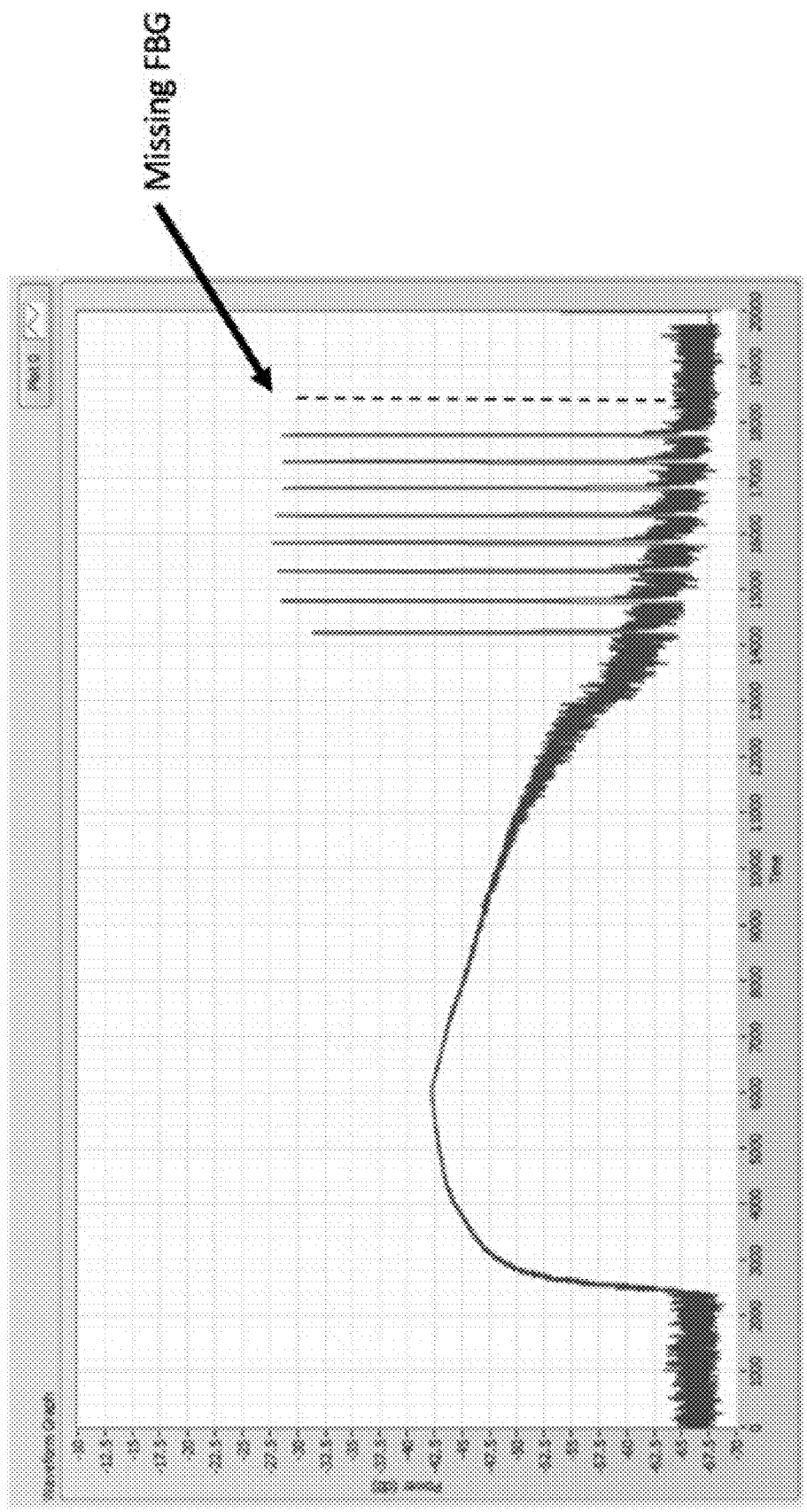
FIG. 25 is a plot illustrating Rayleigh noise and FBG signals having been temporally separated, FBG detections robust across GPON standards requirements according to aspects of the present disclosure.
Figure 26:
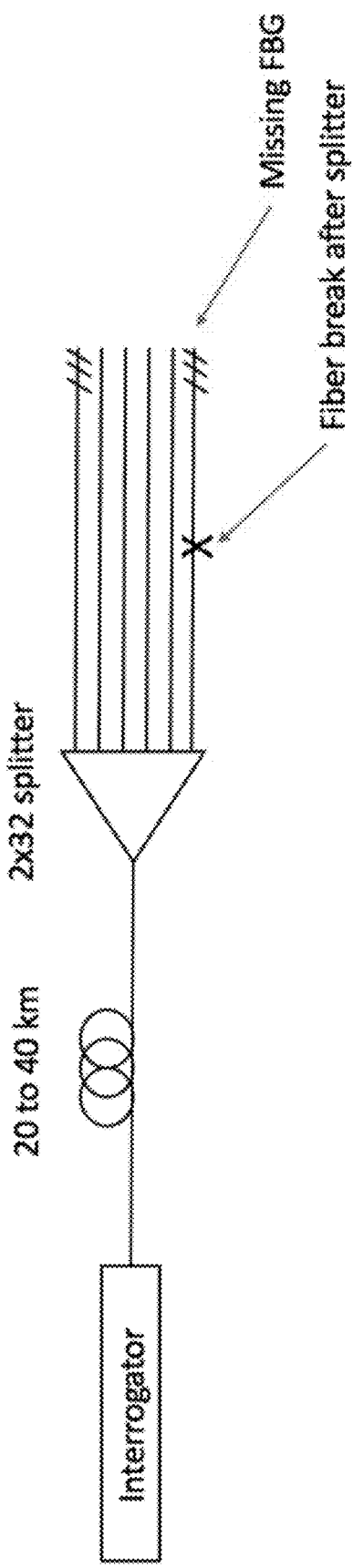
FIG. 26 shows a schematic of FBG detections—now robust—GPON ONU path failures that may be uniquely and definitively identified according to aspects of the present disclosure.

With noise and signal intentionally separated by complimentary configuration of laser/detection timing, fiber leads and sensor wavelength, the swept laser system is now for the first time and uniquely capable of detecting the individual and unique presence or absence of each FBG as shown in FIG. 25 to make a definitive determination of continuity failures on each individual ONU fiber path, as shown in FIG. 26, at wavelengths regions, fiber distances, and coupler split ratios compatible with the GPON standard.

Novel Use of Accumulated Rayleigh to Detect Fault Location

As will be readily appreciated by those skilled in the art, a further aspect of the present is the use of the accumulated Rayleigh noise signal as a means for identifying the location of a fiber failure in parts of the GPON system with the FBG markers cannot offer sufficient spatial resolution to yield actionable information.

Figure 27:
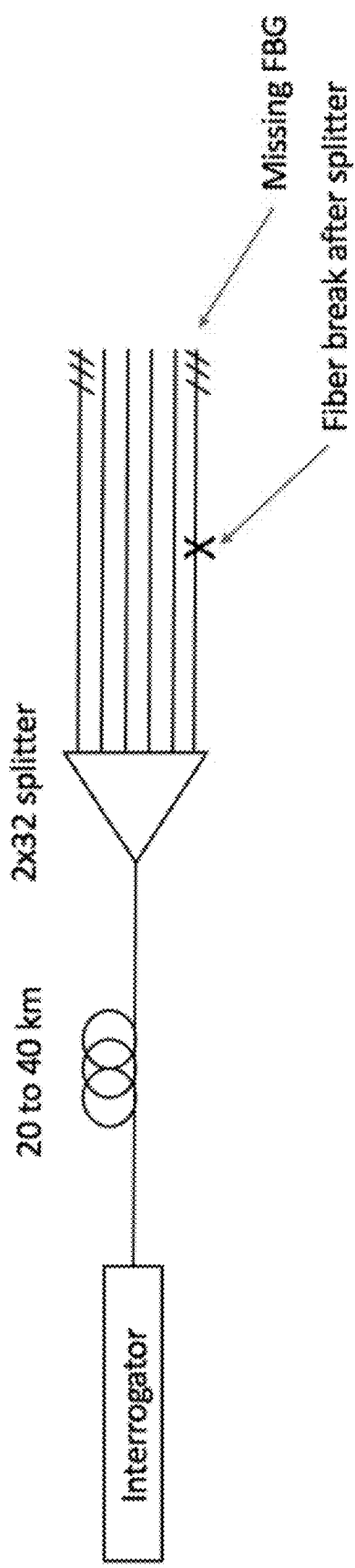
FIG. 27 is a schematic illustrating a fiber break on a GPON channel 9 km into the lead in fiber and prior to a splitter according to aspects of the present disclosure.

For example, consider the failure mechanism where there is a break before the splitter and all of the FBGs were lost, as indicated in FIG. 27.

Figure 28:
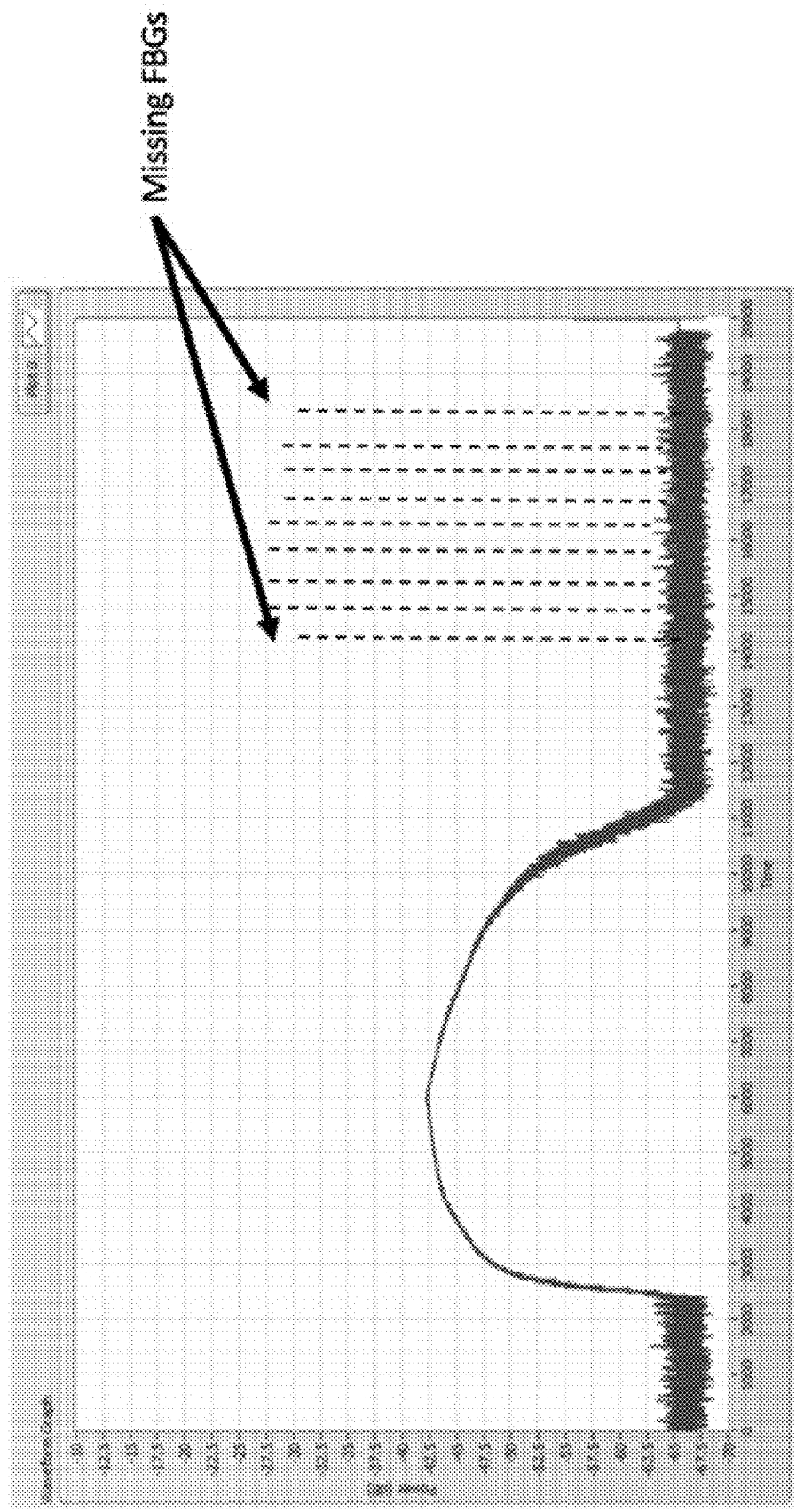
FIG. 28 is a plot illustrating that with a break in the lead in fibers, the expected FBG are no longer present in the measurement according to aspects of the present disclosure.

In this condition, it is somewhat obvious that the spectral reading of the FBG sensors will come up null, as there is no uninterrupted path from the Interrogator to the FBGs and back. This measurements result is indicated in FIG. 28. Not obvious, though, is how the swept wavelength laser interrogator architecture of FIG. 19 can be used to derive actionable information about the location of that fiber break.

This measurements result is indicated in FIG. 28. Not obvious, though, is how the swept wavelength laser interrogator architecture of FIG. 20 can be used to derive actionable information about the location of that fiber break. Carful comparison between the Rayleigh generated spectrum between FIG. 25 and FIG. 28 reveal that the fiber break at 9 km does change the shape. However, as the indicated shape is an unquantifiable amalgam of wavelength varying output power, as well as wavelength and length dependent Rayleigh backscatter efficiencies, no specific determination regarding the location of the fiber break can be made as such.

Building upon the knowledge that an absence of FBGs in the spectrum means that there is a loss or break in the lead-in fiber or the coupler, and using the exact same laser and detection architecture of FIG. 19, a second element of the present invention can be invoked by only a software operating mode change to definitively deduce the distance to/location of the fiber fault.

Figure 29:
FIG. 29 is a plot of alternate software mode of the GPON monitoring swept laser interrogator, gating the laser on at a single wavelength according to aspects of the present disclosure.

FIG. 29 indicates a modified software operating mode of the swept laser interrogator whereby the laser is no longer swept, but rather tuned to a single, relatively static wavelength and gated from off to on at a known point in time. Unlike traditional OTDR, the laser is not then immediately gated off, but rather left in the on position for the remainder of the interrogators data acquisition window, and use timed CW output accumulated Rayleigh to know how far (and thus on which component (pre or post splitter) the detected break actually is.

With the laser having been gated on at a known time (t=0), the receiving photodiode is then rapidly detected and data collected as a function of time and software monitors the time between laser turn on an the point in time at which the accumulated/aggregate reflected power ceases to increase, indicating (through calculations of known data acquisition rates and the speed of light) the exact optical path length and (assuming knowledge of the refractive index of the fiber) the exact physical fiber length between the Interrogator and the break that precluded measurements of the ONU monitoring FBGs.

Figure 30:
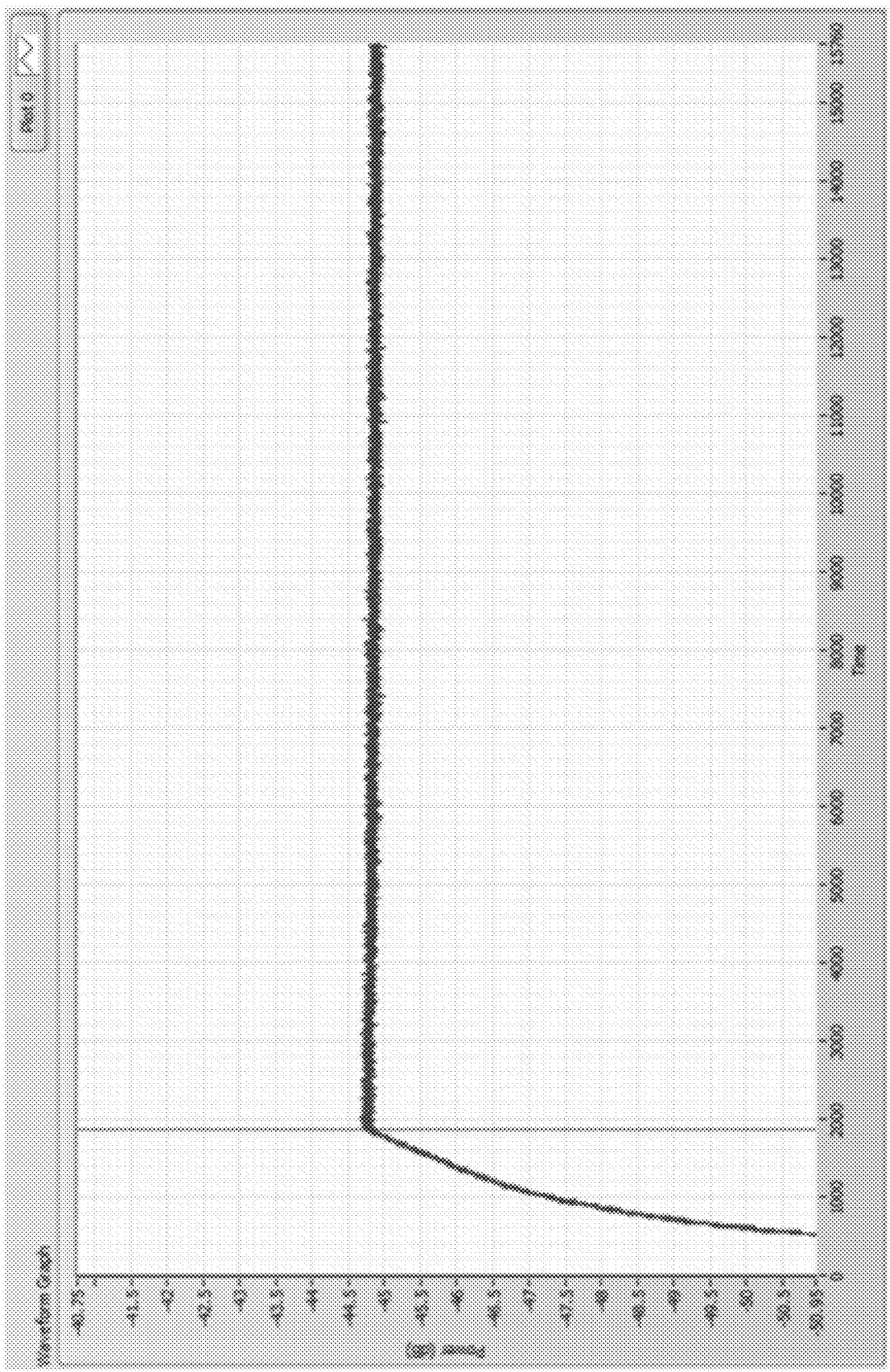
FIG. 30 is a plot illustrating Rayleigh backscattered energy continuing to accumulate until the 9 km break shown in FIG. 27 encountered and received power ceases to increase according to aspects of the present disclosure.
Figure 31:
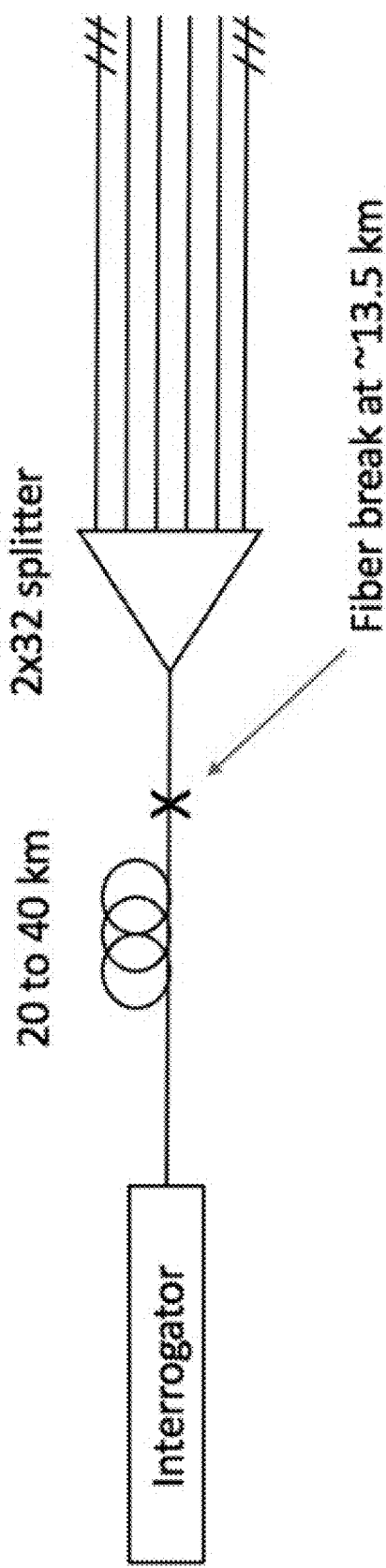
FIG. 31 is a schematic illustrating a 13.5 km break in the GPON lead in fiber according to aspects of the present disclosure.
Figure 32:
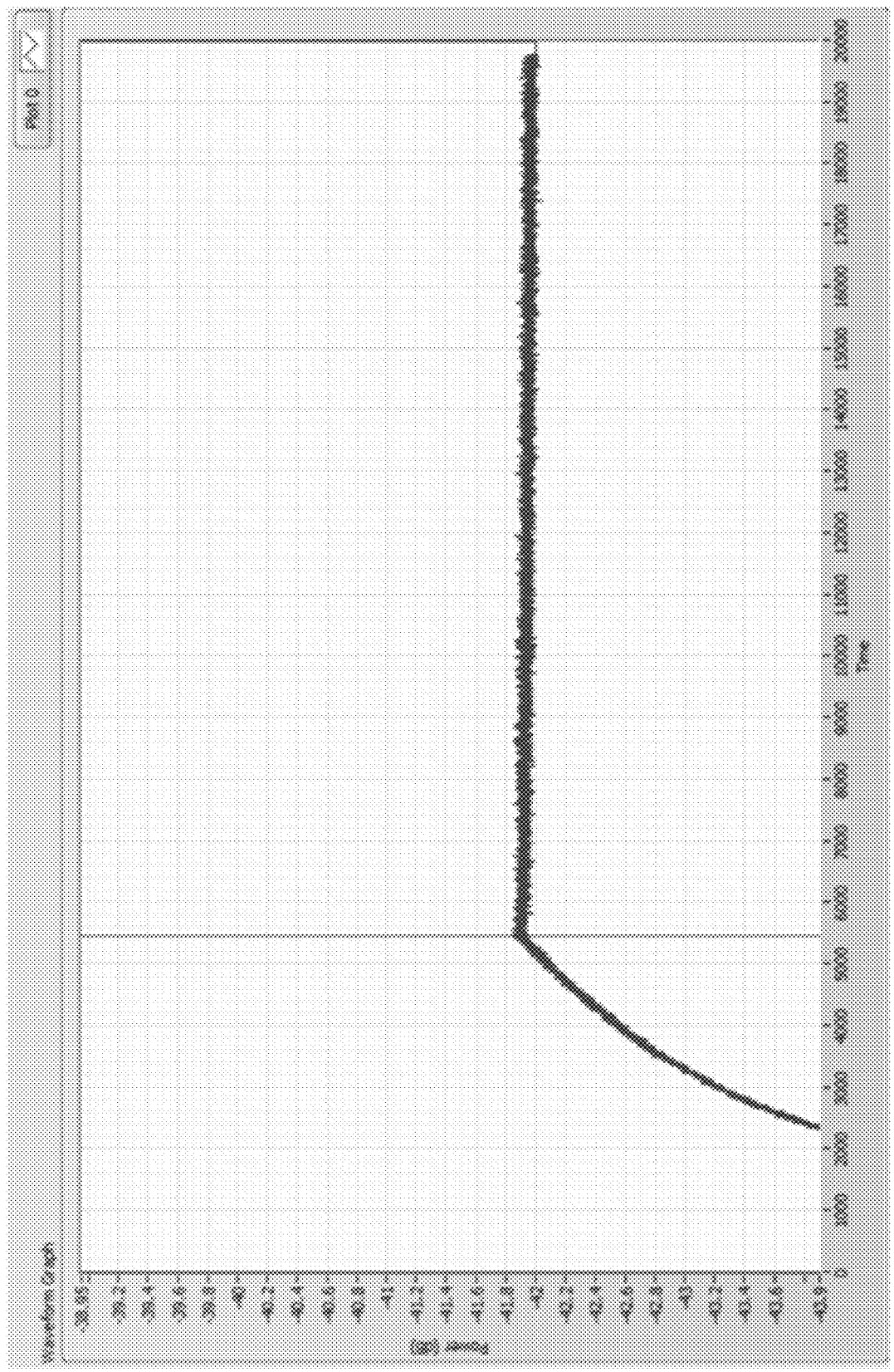
FIG. 32 is a plot illustrating system detection of the 13.5 km break as measured by cessation of increasing accumulated Rayleigh according to aspects of the present disclosure.

As will be readily appreciated by those skilled in the art, once the laser is gated on, the photo diode begins to receive energy returned from the fiber in the form of Rayleigh backscatter. Since in this invention, the laser is never turned off during the acquisition window, the receive power will continue to increase with time as the gated laser light continues to propagate further and further down the fiber until such time that there is no more fiber to contribute additional Rayleigh backscattered energy. That distinct transition is noted as the fiber interruption or break, as shown in FIG. 30.

At this point, those skilled in the art will readily appreciate that while the methods, techniques and structures according to the present disclosure have been described with respect to particular implementations and/or embodiments, those skilled in the art will recognize that the disclosure is not so limited. Of particular interest, systems, methods, and structures according to the present disclosure do not require and in particular implementations do not include any temperature control or temperature compensated sensor elements. Accordingly, the scope of the disclosure should only be limited by the claims appended hereto.

What is claimed is:

1. In an optical network comprising an optical sensor interrogator, one or more fiber optic sensors (FOS), and an optical distribution network optically connecting the optical sensor interrogator to the FOSs, a method for reducing Rayleigh backscatter of light generated by the interrogator, distributed by the distribution network and reflected by the FOS, SAID METHOD CHARACTERIZED BY:

modulating a swept laser included in the interrogator over individual, specific spans of bandwidths of interest, each individual span of bandwidth corresponding to a particular one of the FOS;

receiving, by the interrogator, individual spectral slices corresponding to the individual spans of bandwidth, the individual spectral slices reflected by the FOS corresponding to the individual span of bandwidth;

stitching the received individual spectral slices into a complete response spectrum exhibiting a reduced noise floor degradation due to Rayleigh backscatter as compared with sweeping the laser across its entire bandwidth;

wherein the individual, specific bandwidths of interest are centered about a FOS marker characteristic of the FOS;

wherein the laser emits a lower launch power for each successive span relative to its preceding span.

2. The method of claim 1 FURTHER CHARACTERIZED BY:

adjusting the lasing time of the swept laser such that it is specific to a particular wavelength band of interest.

3. The method of claim 2 FURTHER CHARACTERIZED BY:

each of the lasing time(s) specific to a particular wavelength band of interest is different from each other.

4. The method of claim 3 FURTHER CHARACTERIZED BY:

only a single one of the FOS is responsive to a given laser sweep over a particular bandwidth span.

5. The method of claim 4 FURTHER CHARACTERIZED BY;

the stitched overall spectrum is independent of distribution network distance.

6. The method of claim 5 FURTHER CHARACTERIZED BY:

the distribution network is at least 30 Km in length.

7. The method of claim 6 FURTHER CHARACTERIZED BY:

pulses of laser light from the swept source are reflected by the FOS and optical time domain reflectometry (OTDR) trace artifacts are determined from the reflected light.

* * * * *